United States Patent
Kim et al.

(10) Patent No.: US 12,484,094 B2
(45) Date of Patent: Nov. 25, 2025

(54) DYNAMIC CONFIGURATION OF MULTILINK FUNCTION IN WIRELESS LAN SYSTEM

(71) Applicant: LG Electronics Inc., Seoul (KR)

(72) Inventors: Namyeong Kim, Seoul (KR); Jeongki Kim, Seoul (KR); Jinsoo Choi, Seoul (KR); Taewon Song, Seoul (KR); Insun Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 393 days.

(21) Appl. No.: 18/016,073

(22) PCT Filed: Jul. 14, 2021

(86) PCT No.: PCT/KR2021/009038
§ 371 (c)(1),
(2) Date: Jan. 13, 2023

(87) PCT Pub. No.: WO2022/015045
PCT Pub. Date: Jan. 20, 2022

(65) Prior Publication Data
US 2023/0337293 A1     Oct. 19, 2023

(30) Foreign Application Priority Data

Jul. 15, 2020  (KR) .......................... 10-2020-0087645
Jul. 22, 2020  (KR) .......................... 10-2020-0091146

(51) Int. Cl.
*H04W 76/10*     (2018.01)
*H04W 84/12*     (2009.01)

(52) U.S. Cl.
CPC ............ *H04W 76/10* (2018.02); *H04W 84/12* (2013.01)

(58) Field of Classification Search
CPC ... H04W 76/10; H04W 84/12; H04W 74/006; H04W 28/08; H04W 36/08
See application file for complete search history.

(56) References Cited

U.S. PATENT DOCUMENTS

| | | | |
|---|---|---|---|
| 2008/0102852 A1* | 5/2008 | Du | H04W 48/20 455/453 |
| 2017/0188376 A1* | 6/2017 | Noh | H04W 52/42 |

(Continued)

FOREIGN PATENT DOCUMENTS

KR    20130028972    3/2013

OTHER PUBLICATIONS

Jang et al., "Indication of Multi-link Information," IEEE 802.11-20/0028r6, Jan. 2020, 14 pages.

(Continued)

*Primary Examiner* — Mohammad S Anwar
(74) *Attorney, Agent, or Firm* — Fish & Richardson P.C.

(57) ABSTRACT

In a wireless local area network (LAN) system, a station (STA) can receive, from an access point (AP), a physical protocol data unit (PPDU) including basic service set (BSS) load information. The BSS load information can include information related to the number of STAs associated with a BSS of the AP and the number of enabled STAs from among the STAs associated with the BSS of the AP. The STAs can decode the PPDU. The STAs associated with the BSS of the AP can include enabled STAs and disabled STAs. The disabled STAs can include STAs operating in links to which no traffic identifier (TID) is mapped. Links in which the enabled STAs operate can include links to which at least one traffic identifier (TID) is mapped.

9 Claims, 38 Drawing Sheets

(56) References Cited

U.S. PATENT DOCUMENTS

2020/0053773 A1    2/2020  Seok et al.
2021/0037583 A1*   2/2021  Seok ................... H04W 76/15

OTHER PUBLICATIONS

Park et al., "Multi-link TIM—follow up," IEEE 802.11-20/0084r1, Apr. 2020, 9 pages.
Patil et al., "Container for advertising ML Information," IEEE 802.11-20/0357r3, Mar. 2020, 30 pages.

* cited by examiner

FIG. 1
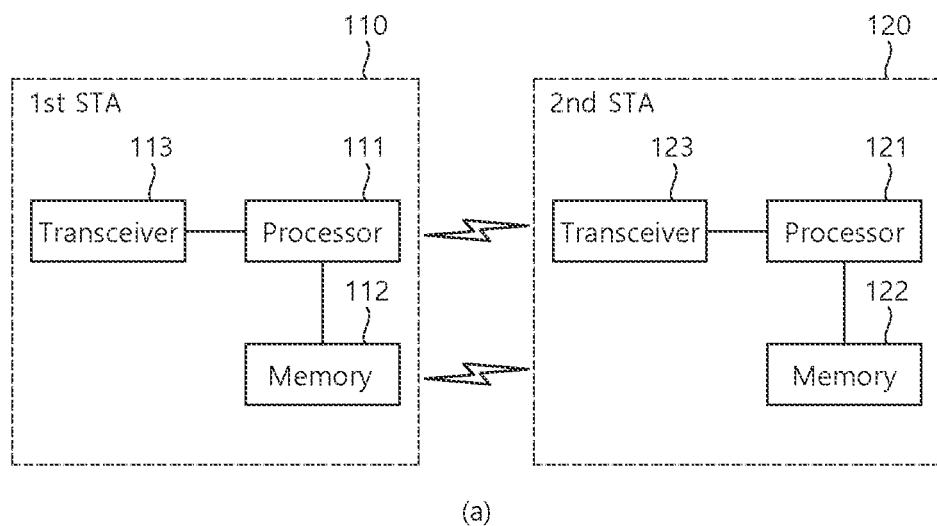
(a)
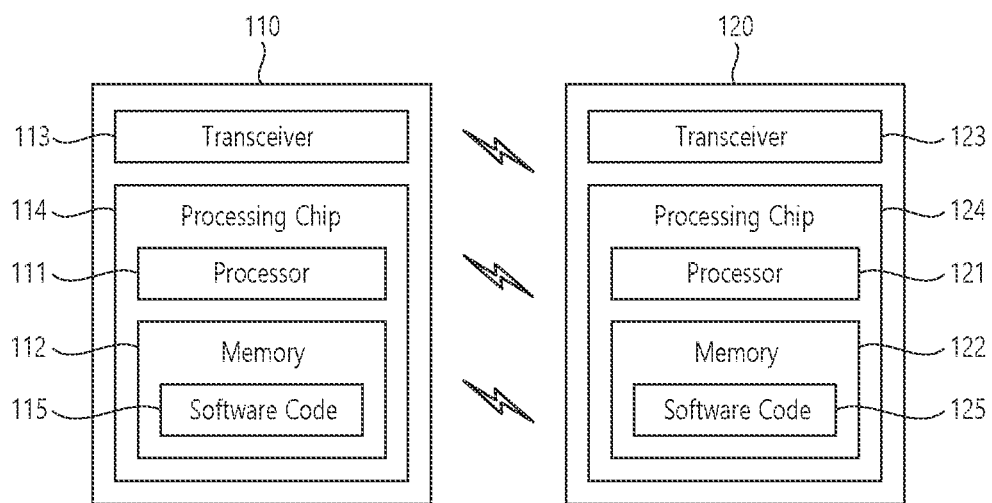
(b)

FIG. 2
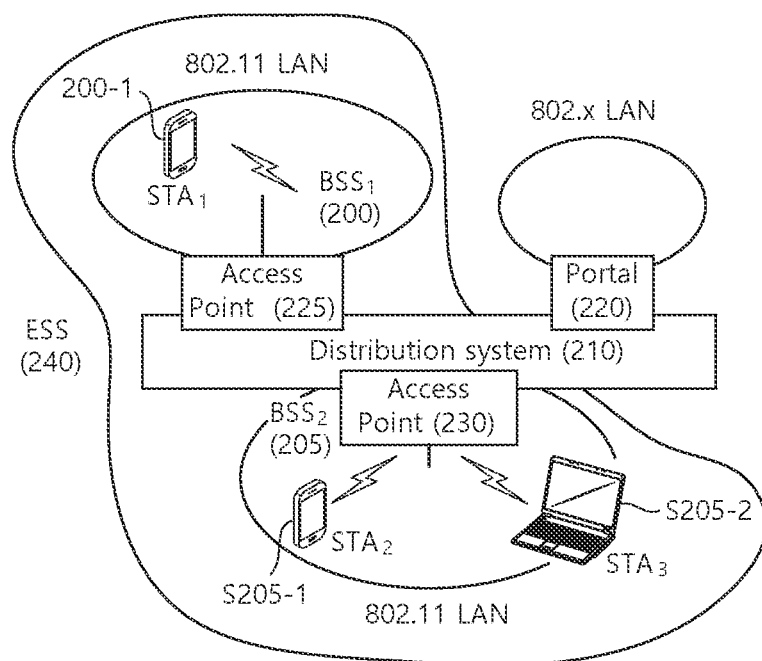
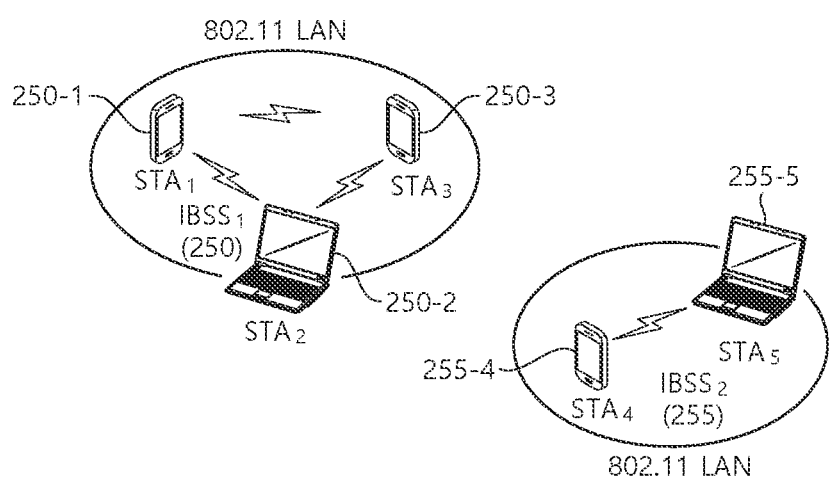

FIG. 6

| Multi-link STA | | |
|---|---|---|
| 5GHz | 6GHz | |
| STA 1 Link 1 | STA 2 Link 2 | STA 3 Link 3 |

FIG. 22

| Element ID | Length(s) | Station Count | Station Count for anchor link | Channel Utilization | Available Admission Capacity |

FIG. 23

| Link ID 1 | Element ID | Length(s) | Station Count | Station Count for anchor link | Channel Utilization | Available Admission Capacity | Link ID 2 | ... |

FIG. 24

| Element ID | Length(s) | Station Count | SR STA Count with SL | Channel Utilization | Available Admission Capacity |

FIG. 25

| Element ID | Length(s) | Station Count | Legacy STA Count with SL | Channel Utilization | Available Admission Capacity |

FIG. 26

| Element ID | Length(s) | Station Count | SR STA Count with SL | Legacy STA Count with SL | Channel Utilization | Available Admission Capacity |
|---|---|---|---|---|---|---|

FIG. 27

| Element ID | Length(s) | Station Count | Station Count with SL | Channel Utilization | Available Admission Capacity |

FIG. 28

| Link ID 1 | Element ID | Length(s) | Station Count | SR STA Count with SL | Channel Utilization | Available Admission Capacity | Link ID 2 | ... |

FIG. 29

| Element ID | Length(5) | Station Count | Channel Utilization | Available Admission Capacity |
|---|---|---|---|---|

Octets:  1  1  2  1  2

FIG. 30
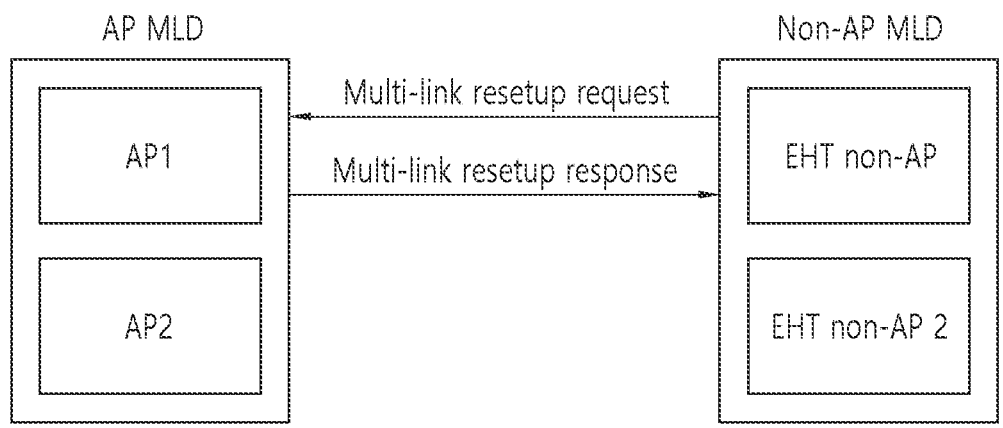
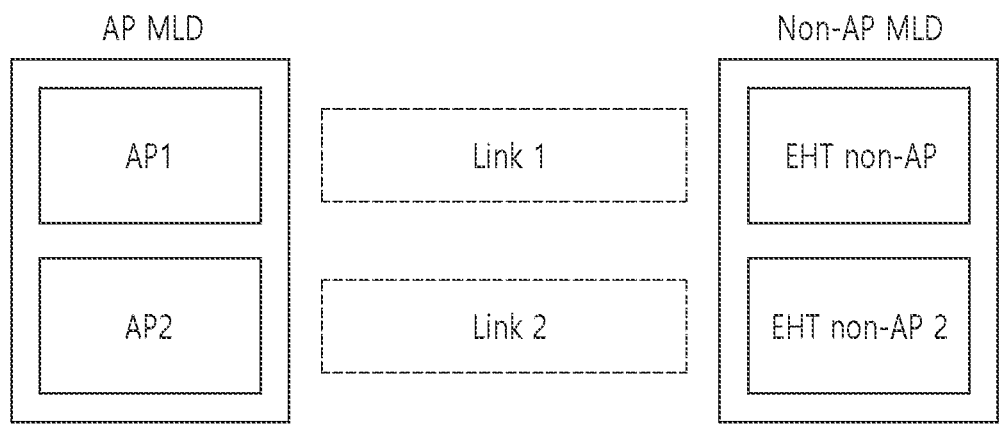

FIG. 33

| Element ID | Length | Station Count | Enabled Station Count | Channel Utilization | Available Admission Capacity |

FIG. 34

| Element ID | Length | Station Count | Enabled Station Count | Station Count With SL | Channel Utilization | Available Admission Capacity |

FIG. 35

| Element ID | Length | Element ID Extension | EHT STA Count | ... |

FIG. 36

| Element ID | Length | Element ID Extension | EHT STA Count | Single link Device Count | ... |

DYNAMIC CONFIGURATION OF MULTILINK FUNCTION IN WIRELESS LAN SYSTEM

CROSS-REFERENCE TO RELATED APPLICATIONS

This application is a National Stage application under 35 U.S.C. § 371 of International Application No. PCT/KR2021/009038, filed on Jul. 14, 2021, which claims the benefit of Korean Patent Application No. 10-2020-0087645, filed on Jul. 15, 2020, and Korean Patent Application No. 10-2020-0091146, filed on Jul. 22, 2020. The disclosures of the prior applications are incorporated by reference in their entirety.

TECHNICAL FIELD

The present disclosure relates to a method for prescribing and configuring a function that a multi-link device (MLD) can be used in a multi-link environment in a wireless local area network (WLAN) system.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

According to various embodiments, in a wireless local area network (LAN) system, a station (STA) may receive a physical protocol data unit (PPDU) including basic service set (BSS) load information from an access point (AP). The BSS load information may include information related to the number of STAs associated with a BSS of the AP and the number of enabled STAs from among the STAs associated with the BSS of the AP. The STAs may decode the PPDU. The STAs associated with the BSS of the AP may include enabled STAs and disabled STAs. The disabled STAs may include STAs operating in links to which no traffic identifier (TID) is mapped. Links in which the enabled STAs operate can include links to which at least one traffic identifier (TID) is mapped.

According to an example of the present disclosure, since only counts for STAs actually operating within the BSS can be considered, the AP can secure a more effective metric in performing load balancing. Even from the STA's point of view, it can be helpful when selecting which BSS to operate in.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 6 shows an example of the structure of a non-AP MLD.

FIG. 22 is a diagram illustrating an embodiment of a BSS load element in consideration of an anchor link.

FIG. 23 is a diagram illustrating an embodiment of a BSS load element in consideration of an anchor link.

FIG. 24 is a diagram illustrating an embodiment of a BSS load element including information related to a single link STA.

FIG. 25 is a diagram illustrating an embodiment of a BSS load element including information related to a single link STA.

FIG. 26 is a diagram illustrating an embodiment of a BSS load element including information related to a single link STA.

FIG. 27 is a diagram illustrating an embodiment of a BSS load element including information related to a single link STA.

FIG. 28 is a diagram illustrating an embodiment of a BSS load element including information related to a single link STA.

FIG. 29 is a diagram illustrating an embodiment of a BSS load element.

FIG. 30 is a diagram illustrating an embodiment of a multi-link setup method between MLDs.

FIG. 33 is a diagram illustrating an embodiment of a BSS load element.

FIG. 34 is a diagram illustrating an embodiment of a BSS load element.

FIG. 35 is a diagram illustrating an embodiment of an EHT BSS load element.

FIG. 36 is a diagram illustrating an embodiment of an EHT BSS load element.

DETAILED DESCRIPTION

Figure 3:
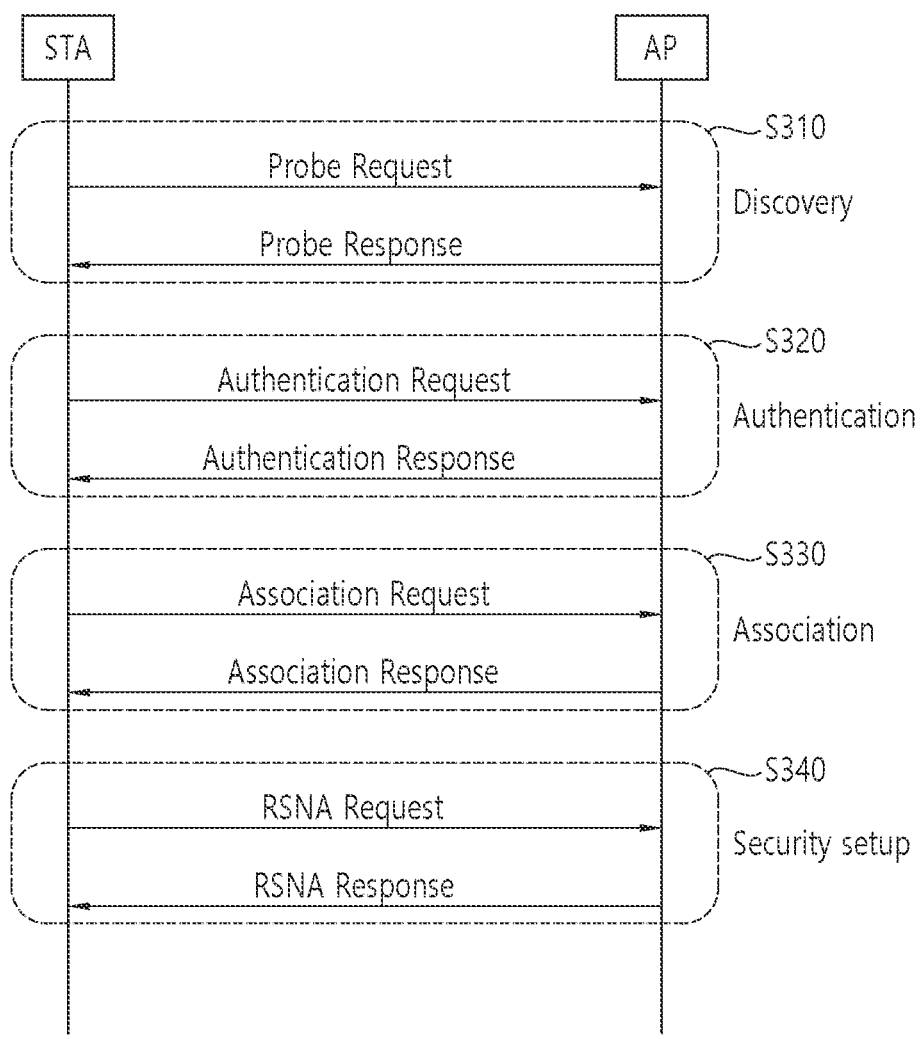
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example. "A, B, C" may mean "A, B, or C".

In the present specification. "at least one of A and B" may mean "only A", "only B", or "both A and B". In addition, in the present specification, the expression "at least one of A or B" or "at least one of A and/or B" may be interpreted as "at least one of A and B".

In addition, in the present specification. "at least one of A, B, and C" may mean "only A". "only B". "only C", or "any combination of A. B. and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU: 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 1 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an AP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 2554, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Hereinafter, the PPDU transmitted/received by the STA of the present specification will be described.

Figure 4:
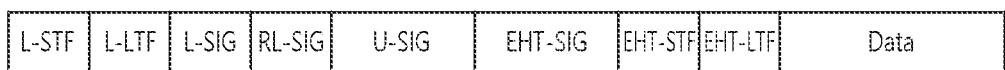
FIG. 4 illustrates an example of a PPDU used in the present specification.

FIG. 4 illustrates an example of a PPDU used in the present specification.

The PPDU of FIG. 4 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 4 may indicate the entirety or part of a PPDU type used in the EHT system. For example, the example of FIG. 4 may be used for both of a single-user (SU) mode and a multi-user (MU) mode. In other words, the PPDU of FIG. 4 may be a PPDU for one receiving STA or a plurality of receiving STAs. When the PPDU of FIG. 4 is used for a trigger-based (TB) mode, the EHT-SIG of FIG. 4 may be omitted. In other words, a STA which has received a trigger frame for uplink-MU (UL-MU) may transmit the PPDU in which the EHT-SIG is omitted in the example of FIG. 4.

In FIG. 4, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 4 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 4, the L-LTE and the L-STF may be the same as those in the conventional fields.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 4. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 µs. Each symbol of the U-SIG may be used to transmit the 26-bit information. For example, each symbol of the U-SIG may be transmitted/received based on 52 data tomes and 4 pilot tones.

The common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

The common field of the EHT-SIG may include a CRC bit and a tail bit. A length of the CRC bit may be determined as 4 bits. A length of the tail bit may be determined as 6 bits, and may be set to '000000'.

The common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 4. The PPDU of FIG. 4 may be used to transmit/receive frames of various types. For example, the PPDU of FIG. 4 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 4 may be used for a management frame. An example of the management frame may include a beacon frame, a (re-)association request frame, a (re-)association response frame, a probe request frame, and a probe response frame. For example, the PPDU of FIG. 4 may be used for a data frame. For example, the PPDU of FIG. 4 may be used to simultaneously transmit at least two or more of the control frame, the management frame, and the data frame.

Figure 5:
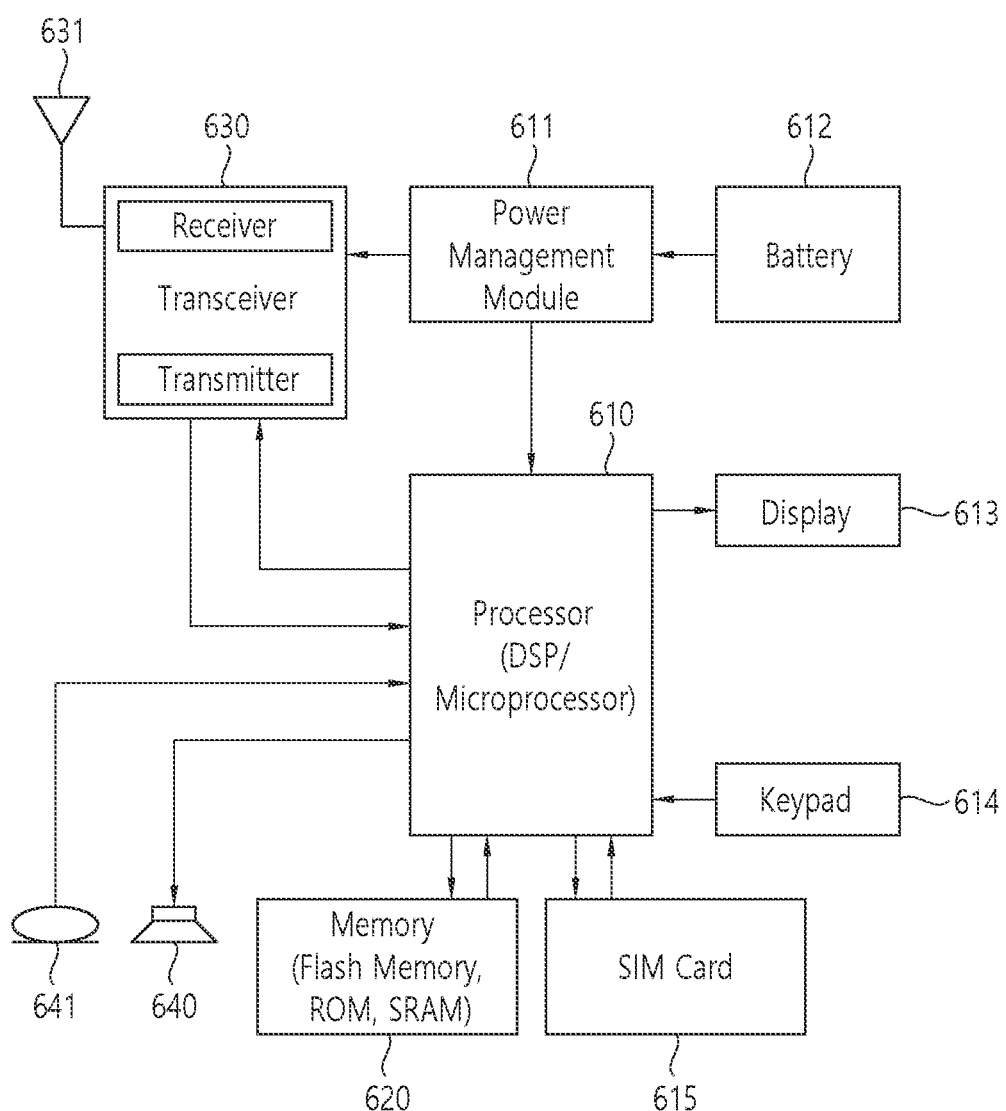
FIG. 5 illustrates an example of a modified transmission device and/or receiving device of the present specification.

FIG. 5 illustrates an example of a modified transmission device and/or receiving device of the present specification.

Each device/STA of the sub-figure (a)/(b) of FIG. 1 may be modified as shown in FIG. 5. A transceiver 630 of FIG. 5 may be identical to the transceivers 113 and 123 of FIG. 1. The transceiver 630 of FIG. 5 may include a receiver and a transmitter.

A processor 610 of FIG. 5 may be identical to the processors 111 and 121 of FIG. 1. Alternatively, the processor 610 of FIG. 5 may be identical to the processing chips 114 and 124 of FIG. 1.

A memory 620 of FIG. 5 may be identical to the memories 112 and 122 of FIG. 1. Alternatively, the memory 620 of FIG. 5 may be a separate external memory different from the memories 112 and 122 of FIG. 1.

Referring to FIG. 5, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 5, a speaker 640 may output a result related to a sound processed by the processor 610. A microphone 641 may receive an input related to a sound to be used by the processor 610.

Hereinafter, technical features of a multi-link (ML) supported by a STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown, the 5 GHz band, and the 6 GHz band (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one of a management frame, a control frame, and a data frame.

When one STA supports multiple links, a transceiver supporting each link may operate as one logical STA. For example, one STA supporting two links may be expressed as one Multi Link Device (MLD) including a first STA for the first link and a second STA for the second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (AP MLD and/or non-AP MLD) may transmit, through ML setup, information on a link that the corresponding MLD can support. Link information may be configured in various ways. For example, information on the link may include at least one of 1) information on whether the MLD (or STA) supports simultaneous RX/TX operation, 2) information on the number/upper limit of uplink/downlink links supported by the MLD (or STA), 3) information on the location/band/resource of the uplink/downlink Link supported by the MLD (or STA), 4) information on the frame type (management, control, data, etc.) available or preferred in at least one uplink/downlink link, 5) information on ACK policy available or preferred in at least one uplink/downlink link, and 6) information on an available or preferred traffic identifier (TID) in at least one uplink/downlink Link. The TID is related to the priority of traffic data and is expressed as eight types of values according to the conventional wireless LAN standard. That is, eight TID values corresponding to four access categories (ACs) (AC_Background (AC_BK), AC_Best Effort (AC_BE), AC_Video (AC_VI), AC_Voice (AC_VO)) according to the conventional WLAN standard may be defined.

For example, it may be preset that all TIDs are mapped for uplink/downlink links. Specifically, if negotiation is not made through ML setup, if all TIDs are used for ML communication, and if the mapping between uplink/downlink link and TID is negotiated through additional ML settings, the negotiated TID may be used for ML communication.

Through ML setup, a plurality of links usable by the transmitting MLD and the receiving MLD related to ML communication may be set, and this may be referred to as an "enabled link". The "enabled link" may be called differently in various expressions. For example, it may be referred to as various expressions such as a first link, a second link, a transmission link, and a reception link.

After the ML setup is completed, the MLD could update the ML setup. For example, the MLD may transmit information on a new link when it is necessary to update information on the link. Information on the new link may be transmitted based on at least one of a management frame, a control frame, and a data frame.

According to an embodiment, the MLD may include anon-AP MLD and an AP-MLD. The non-AP MLD and the AP-MLD may be classified according to the function of an access point (AP). The non-AP MLD and the AP-MLD may be physically separated or logically separated. For example, when the MLD performs an AP function, it may be referred to as an AP MLD, and when the MLD performs a STA function, it may be referred to as a non-AP MLD.

In the following specification, MLD has one or more connected STAs and has one MAC service access point (SAP) that connects to an upper link layer (Logical Link Control, LLC). MLD may mean a physical device or a logical device. Hereinafter, a device may mean an MLD.

In addition, the MLD may include at least one STA connected to each link of the multi-link. For example, the processor of the MLD may control the at least one STA. For example, the at least one STA may be independently configured and operated. The at least one STA may include a processor and a transceiver, respectively. For example, the at least one STA may operate independently regardless of the processor of the MLD.

In the following specification, for the convenience of description, it is described that the MLD (or the processor of the MLD) controls at least one STA, but is not limited thereto. As described above, the at least one STA may transmit/receive a signal independently regardless of the MLD.

According to an embodiment, an AP MLD or a non-AP MLD may be configured in a structure having a plurality of links. In other words, the non-AP MLD may support a plurality of links. The non-AP MLD may include a plurality of STAs. A plurality of STAs may have a link for each STA.

In the EHT standard (802.11be standard), a Multi-Link Device (MLD) structure in which one AP/non-AP MLD supports multiple links is considered as a major technology. STAs included in the non-AP MLD may transmit information on other STAs in the non-AP MLD together through one link. Accordingly, there is an effect that the overhead of frame exchange is reduced. In addition, there is an effect of increasing the link usage efficiency of the STA and reducing power consumption.

FIG. 6 shows an example of the structure of anon-AP MLD.

Referring to FIG. 6, the non-AP MLD may have a structure having a plurality of links. In other words, the non-AP MLD may support a plurality of links. The non-AP MLD may include a plurality of STAs. A plurality of STAs may have a link for each STA. FIG. 6 shows an example of a structure of a non-AP MLD, but the structure of an AP MLD may be configured the same as an example of a structure of a non-AP MLD shown in FIG. 6.

For example, the non-AP MLD may include STA 1, STA 2, and STA 3. STA 1 may operate on link 1. Link 1 may be included in the 5 GHz band. STA 2 may operate on link 2. Link 2 may be included in the 6 GHz band. STA 3 may operate in link 3. Link 3 may be included in the 5 GHz band. The bands including link 1/2/3 may be an example, and they may be included in 2.4, 5, and 6 GHz.

As such, in the case of an AP/non-AP MLD supporting multi-link, each AP of the AP MLD and each STA of the non-AP MLD may be connected to each link through a link setup process. And at this time, the connected link may be changed or reconnected to another link by an AP MLD or a non-AP MLD depending on the situation.

In addition, in the EHT standard, in order to reduce power consumption, a link may be divided into an anchored link or a non-anchored link. The anchored link or the non-anchored link can be called variously. For example, the anchored link may be called a primary link. The non-anchored link may be called a secondary link.

According to an embodiment, the AP MLD supporting multi-link can be managed by designating each link as an anchored link or a non-anchored link. AP MLD may support one or more Links among a plurality of Links as the anchored link. The non-AP MLD can be used by selecting one or more of its own anchored links from the Anchored Link List (the list of anchored links supported by the AP MLD).

For example, the anchored link may be used for non-data frame exchange (i.e. Beacon and Management frame) as well as frame exchange for synchronization. Also, a non-anchored link can be used only for data frame exchange.

The non-AP MLD can perform monitoring (or monitor) only the anchored link to receive the Beacon and Management frame during the idle period. Therefore, in the case of a non-AP MLD, it must be connected to at least one anchored link to receive a beacon and a management frame. The one or more anchored links should always maintain the enabled state. In contrast, the non-anchored links can only be used for data frame exchange. Therefore, the STA corresponding to the non-anchored link (or the STA connected to the non-anchored link) may enter a doze during the idle period when the channel/link is not used. This has the effect of reducing power consumption.

Therefore, in the following specification, a protocol in which an AP MLD or a non-AP MLD dynamically recommends or requests a link reconnection according to a situation may be proposed for an efficient link connection. In addition, in the following specification, an anchored link reconnection protocol in consideration of the characteristics of an anchored link used for the purpose of power reduction as well as a general link may be additionally proposed.

Embodiment for Link Change and Reconnection

According to an embodiment, each link between the AP MLD and the non-AP MLD may be determined in an Association or (re)Association process. At this time, the AP MLD and the non-AP MLD can perform frame exchange through the connected link. A specific embodiment in which the AP MLD and the non-AP MLD are connected through the link setup process may be described with reference to FIG. 7.

Figure 7:
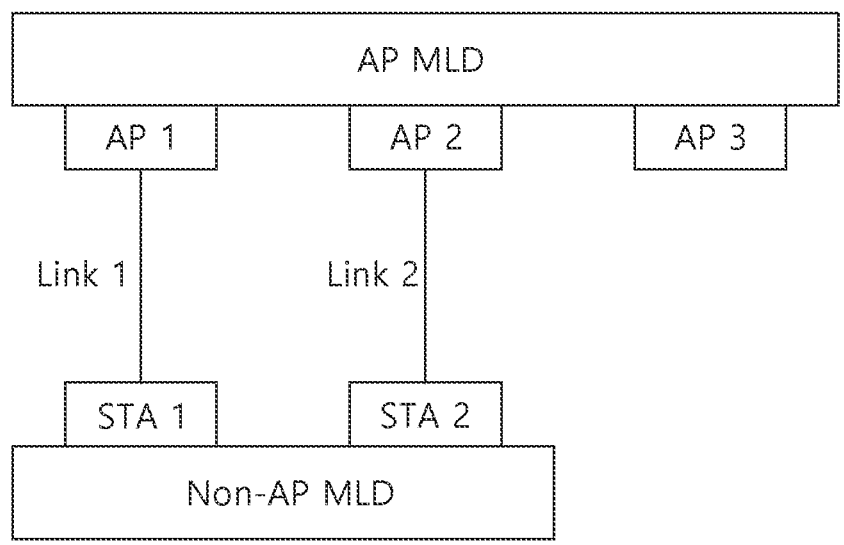
FIG. 7 illustrates an example in which an AP MLD and a non-AP MLD are connected through a link setup process.

FIG. 7 illustrates an example in which an AP MLD and anon-AP MLD are connected through a link setup process.

Referring to FIG. 7, the AP MLD may include AP 1, AP 2, and AP 3. The non-AP MLD may include STA 1 and STA 2. AP 1 and STA 1 may be connected through link 1. AP 2 and STA 2 may be connected through link 2.

For example, AP 1 and STA 1 may be connected through link 1 through a first link setup process. AP 2 and STA 2 may be connected through link 2 through a second link setup process. As another example, an AP MLD and a non-AP MLD may be connected through one link setup process. In other words, an AP MLD and a non-AP MLD may be connected through link 1 and link 2 based on one link setup process.

As described above, each AP and STA may perform frame exchange through a connected link. In addition, information on other APs on a different link or other STAs on a different link may be transmitted/received through one link.

However, after this link setup process, the AP MLD or non-AP MLD may request a link change or reconnection for more efficient frame exchange (for example, load balancing or interference avoiding, and the like) depending on the situation/environment.

An embodiment related to link change or reconnection may be described with reference to FIG. 8.

Figure 8:
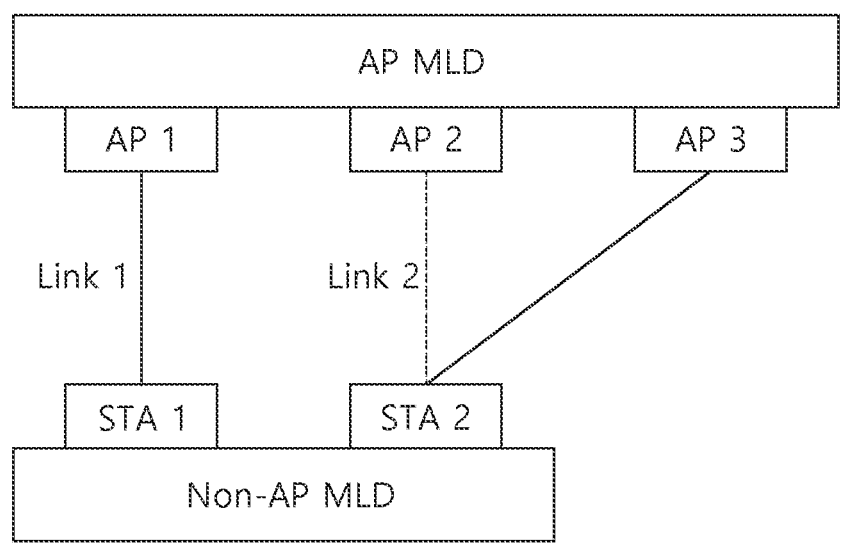
FIG. 8 shows an example in which a link is changed or reconnected.

FIG. 8 shows an example in which a link is changed or reconnected.

Referring to FIG. 8, STA 2 is previously connected to AP 2. Thereafter, the data load of AP 2 may be excessively generated. STA 2 may be reconnected to AP 3 having a relatively small data load. In this case, there is an effect that the AP MLD and the non-AP MLD can perform efficient data exchange.

Figure 9:
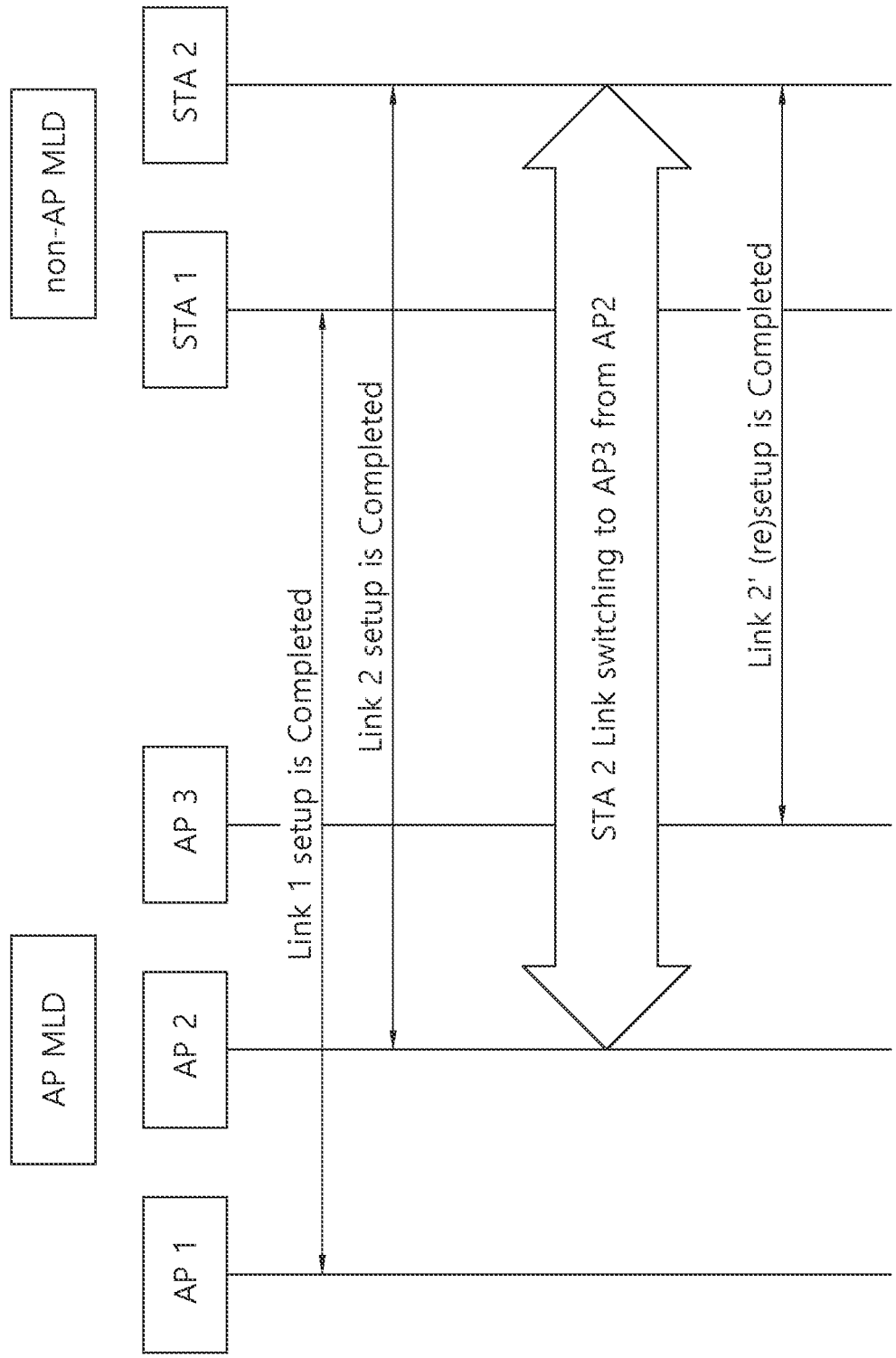
FIG. 9 shows a specific example in which a link is changed or reconnected.

FIG. 9 shows a specific example in which a link is changed or reconnected.

Referring to FIG. 9, AP 1 of the AP MLD may be connected to STA 1 of the non-AP MLD through link 1. AP 2 of the AP MLD may be connected to STA 2 of the non-AP MLD through link 2. Thereafter, STA 2 may attempt/request a connection with AP 3 through link change or reconnection, and STA 2 may be connected with AP 3 through link 2 based on the link change or reconnection.

According to an embodiment, the AP MLD and the non-AP MLD may transmit/receive/exchange various information for each current link and information on the link state. Accordingly, the AP MLD and the non-AP MLD may select a link more suitable for transmitting and receiving a signal based on various information and link states for each current link. For example, various information for each current link may include information on data traffic load for each link and channel access capability between links. For example, the link state may be set to disable or enable.

In the following specification, a process in which the AP MLD/non-AP MLD negotiates with the non-AP MLD/AP MLD to request a change or reconnection to a link other than the linked link in order to improve performance may be referred to as "Link switching negotiation". The name of the "Link switching negotiation" may be called variously, and this may be changed.

Hereinafter, the link change or reconnection process may be divided into a case requested by the AP MLD and a case requested by the non-AP MLD.

An Embodiment in which AP MLD Requests Link Changing or Reconnection

According to an embodiment, the AP MLD may request a link change or reconnection to the non-AP MLD for efficient data transmission. For example, for load balancing, based on the data traffic of each AP, the AP MLD may request the STA to change or reconnect to a more efficient link.

For example, the AP MLD may calculate/verify/determine a link suitable for STAs of the non-AP MLD based on data traffic load information for each AP and/or channel access capability information between each link (for example, information about STR (Simultaneous TX/RX) capability, etc.). Thereafter, the AP MLD may request a link change or reconnection to the STA (or non-AP MLD), based on data traffic load information for each AP and/or channel access capability information between each link.

As described above, when requesting a link change, the AP MLD may transmit link information that it considers most appropriate to the non-AP MLD through a request message. For example, the request message may include a beacon or a management frame.

In relation to the above-described embodiment, an element or field including information on a link considered to be most suitable may be newly proposed. A newly proposed element or field may be defined as a "recommended link". The "recommended link" is an example, and the name of a specific element or field may be changed.

recommend link (element field): An element or field for the AP MLD to recommend the most suitable link to the STA of the non-AP MLD based on various information for each link (for example, data load for each link, etc.). For example, the recommend link (element/field) may be indicated by Link ID information of AP MLD or AP BSS information. In other words, the recommend link (element/field) may include Link ID information of AP MLD or AP BSS information.

According to an embodiment, the recommend Link (element/field) may be optionally included in a Link-switching response and transmitted. For example, the STA may establish a connection with a link recommended by the AP based on the element/field (that is, recommend Link). For another example, the STA may perform a connection request to a link different from the indicated link based on the element/field (that is, recommend Link) and additional information it has.

A detailed signal exchange procedure between an AP MLD and a non-AP MLD according to the above-described embodiment may be described with reference to FIG. 10.

Figure 10:
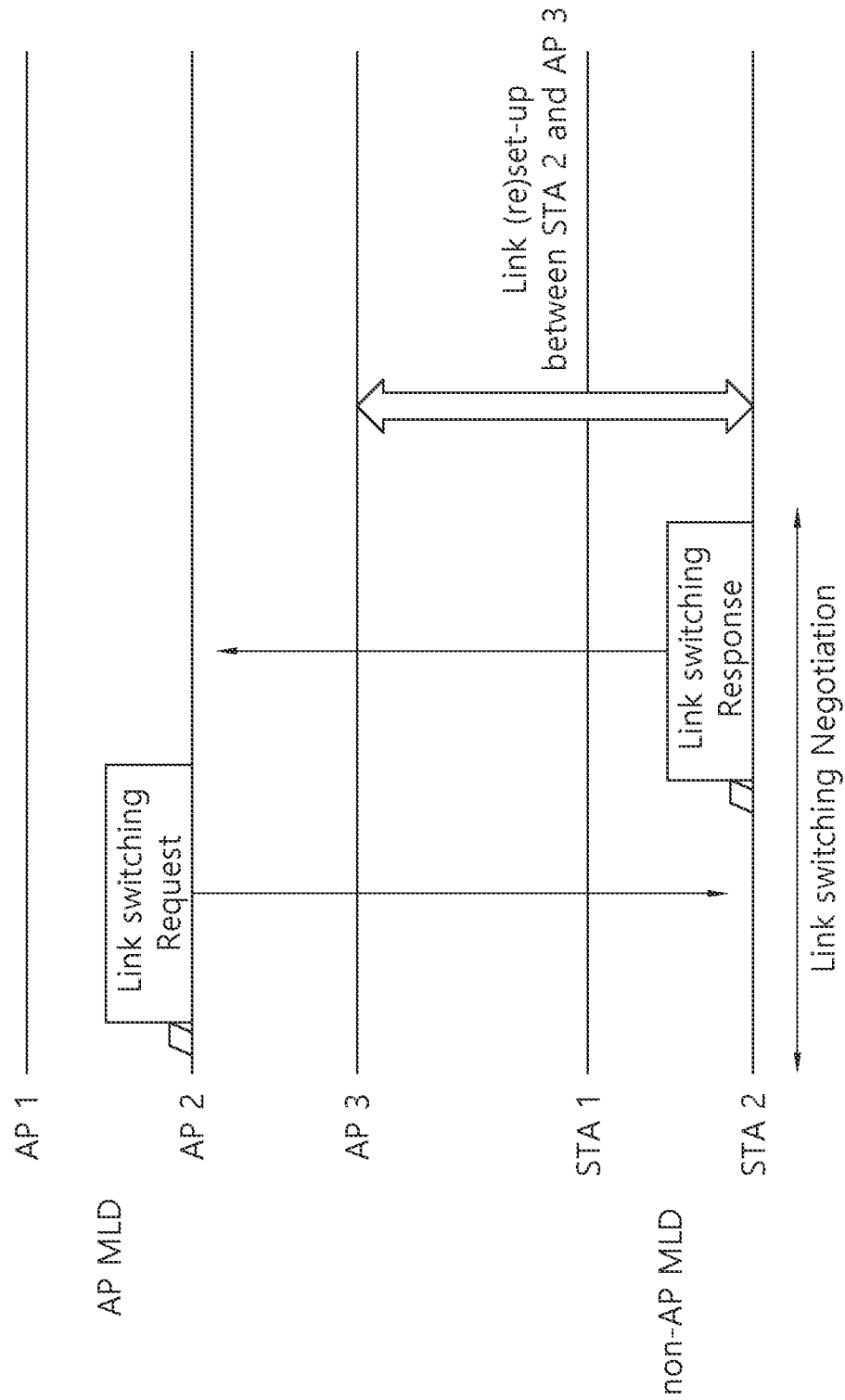
FIG. 10 illustrates the operations of an AP MLD and a non-AP MLD for link change or reconnection.

FIG. 10 illustrates the operations of an AP MLD and a non-AP MLD for link change or reconnection.

Referring to FIG. 10, in a situation in which STA 2 is connected to AP 2 through link 2, a lot of data traffic may be concentrated in AP 2. In other words, when STA 2 is connected to AP 2 through the link 2, a lot of data traffic may be generated in AP 2.

The AP MLD (or AP 2) may request the non-AP MLD (or STA 2) to reconnect to AP 3, which has relatively few STA connections. In general, the message for requesting reconnection is transmitted to the STA (that is, STA 2) that wants to reconnect, but depending on the situation (for example, channel status or link status), it may be transmitted to any STA (that is, another STA). In other words, based on the channel condition or link condition, the STA to which a request message for requesting reconnection (for example, Link-switching request frame) is transmitted may be changed.

For example, when the STA (that is, STA 2) that has received the request message for requesting the reconnection accepts the request, a response message with "Accept" (for example, Link-switching response frame) may be transmitted. For another example, when the STA (that is, STA 2) rejects this request, a response message with "Decline" may be transmitted.

In general, the STA that accepts the reconnection (that is, STA 2) may transmit a response message to the existing Link (the link before reconnection), but the response message may be transmitted through any link (that is, another STA) using the multi-link characteristic.

If STA 2 accepts the link reconnection request, after transmitting the response message, STA 2 may disconnect from the existing AP 2 and request link reconnection to AP 3. In this case, the reconnection request process may be performed in the same way as the existing link setup process between MLDs. After the link setup process between AP 3 and STA 2 is completed, STA 2 may perform frame exchange with AP 3 through Link 2.

Conversely, when STA 2 rejects the link reconnection request, STA 2 and AP 2 may use the existing linked link (that is, link 2) as it is.

According to an embodiment, when the AP requests a link change to the STA and a suitable link is recommended, the STA may or may not change the link to the recommended link. For example, the above-described recommend link may be used for the AP to recommend a link suitable for the STA.

For example, the STA may approve the link change as a response message to the request message for requesting reconnection of the AP. The STA may approve/confirm the link change with the recommended link, or may request another link change from the AP based on information other than the information included in the request message.

Accordingly, the AP needs to inform the STA of whether to accept the response message. To this end, the AP may transmit a confirmation message (for example, link switching confirmation frame) for the STA's response message (for example, Link-switching response frame) to the STA.

Specific operations of the AP MLD and the non-AP MLD of the above-described embodiment may be described with reference to FIG. 11.

Figure 11:
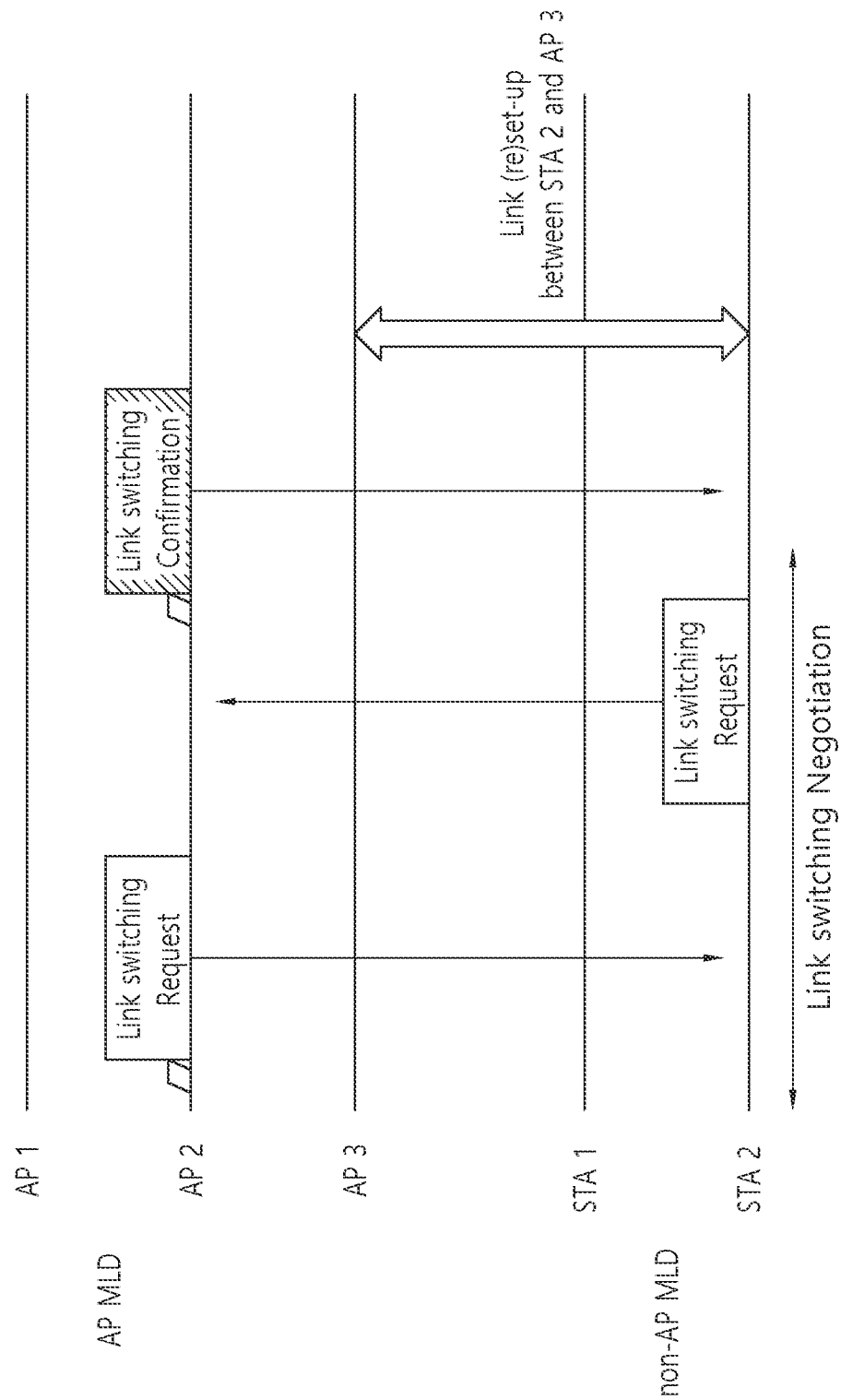
FIG. 11 illustrates the operations of an AP MLD and a non-AP MLD for link change or reconnection.

FIG. 11 illustrates the operations of an AP MLD and a non-AP MLD for link change or reconnection.

Referring to FIG. 11, AP 2 may request a link change to STA 2 by including the recommended link information. In other words, AP 2 may transmit a link-switching request frame including the recommended link information to STA 2.

STA 2 may transmit whether to accept the link request through a Link-switching response frame.

For example, when link switching is accepted, STA 2 may transmit link information to be changed via a link-switching response frame. At this time, the link information to be changed may or may not be the same as the recommended link.

For another example, when STA 2 selects a link other than the recommended link provided by AP 2 and responds with a link-switching response frame, the AP may transmit a message indicating whether to finally approve the link to the STA. The message may be referred to as a link switching confirmation frame.

For example, AP 2 may accept the link change to the link designated by STA 2 through the Link Switching Confirmation frame. STA 2 may attempt to change a link to a link designated by it, based on the Link Switching Confirmation frame.

As another example, AP 2 may refuse to change the link to the link designated by STA 2 through the Link Switching Confirmation frame. STA 2 and AP 2 may maintain the connection with the previously connected link without changing the link.

The embodiment shown in FIG. 11 may be applied even when the AP transmits the link-switching request frame without including the recommended link information. For example, when the AP (for example, AP 2) transmits a link-switching request frame to the STA (for example, STA 2) without the recommended link information, the STA may directly designate a link for changing based on the information it possesses, and then respond to the AP through a link-switching response frame. Even in this case, the AP must finally transmit a Link Switching Confirmation frame for acknowledgment. Accordingly, an embodiment in which the AP transmits the Link Switching Confirmation frame may be applied even when the recommended link information is not included in the Link-switching request frame.

Embodiment in which Non-AP MLD Requests Link Changing or Reconnection

According to an embodiment, the non-AP MLD may request a link change or reconnection to the AP MLD for efficient data transmission. For example, in order to use STR capability during data transmission, the non-AP MLD may request the AP MLD to change or reconnect a connected link.

Figure 12:
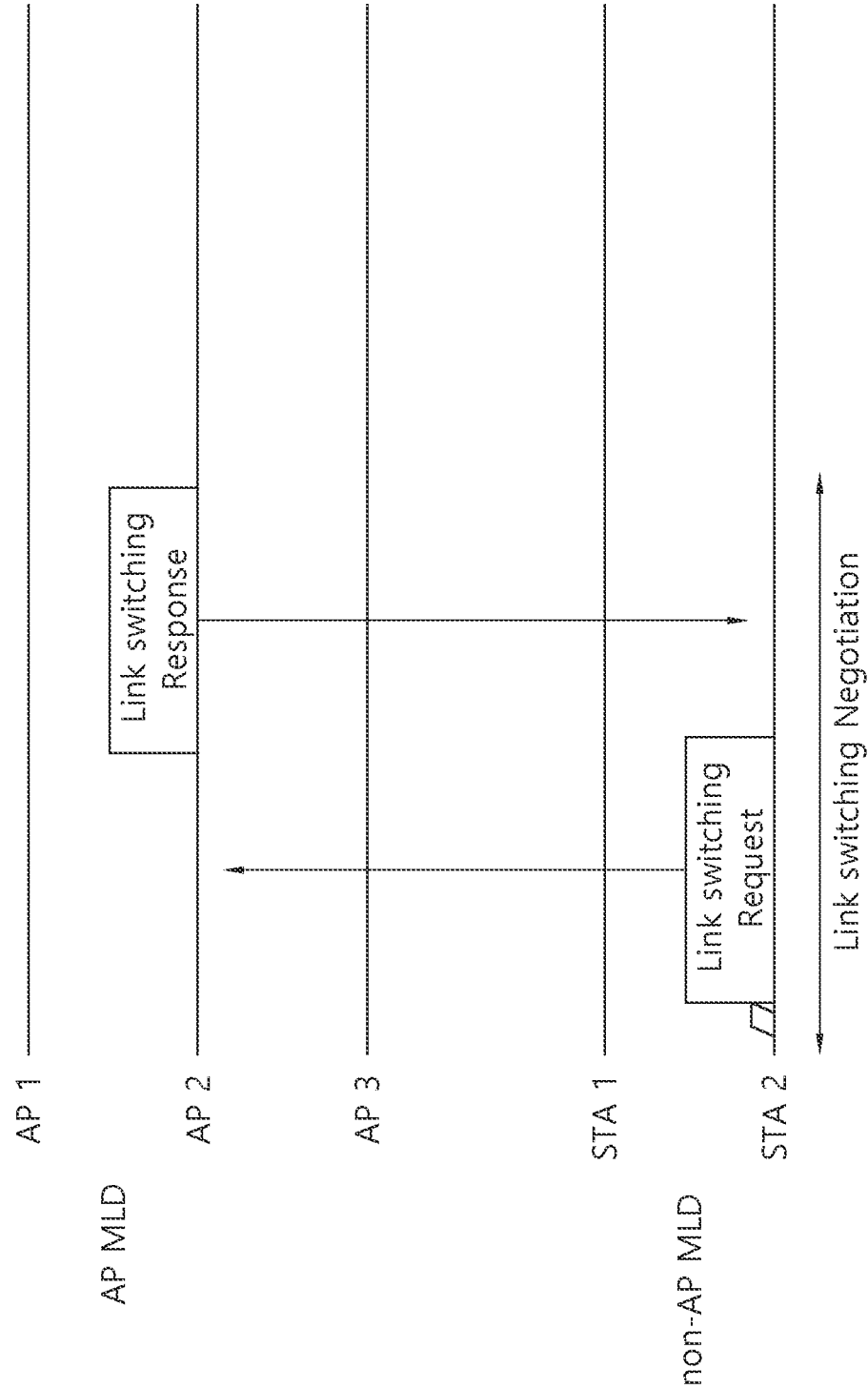
FIG. 12 shows the operations of an AP MLD and a non-AP MLD for link change or reconnection.

FIG. 12 shows the operations of an AP MLD and a non-AP MLD for link change or reconnection.

Referring to FIG. 12, the AP MLD and the non-AP MLD may perform link switching negotiation. STA 2 of the non-AP MLD may transmit a link-switching request frame to AP 2 of the AP MLD. AP 2 of the AP MLD may transmit a link-switching response frame to STA 2 of the non-AP MLD in response to the link-switching request frame. The link-switching request frame or link-switching response frame may be transmitted/received through a link to be changed, but is not limited thereto. The link-switching request frame or link-switching response frame may be transmitted/received through various links as well as the link to be changed.

The non-AP MLD may request link change or reconnection through various methods. Hereinafter, three methods for requesting a link change or reconnection by a non-AP MLD may be proposed. Specifically, the three methods may be sequentially described as a Solicited method, an Unsolicited method, and a General method.

1) Solicited method: A method in which the non-AP MLD requests various information for Link (re)selection from the AP MLD, and requests Link (re)selection based on the received information.

2) Unsolicited method: A method in which the non-AP MLD transmits several pieces of information for Link (re)selection without a separate request for information, and requests Link (re)selection based on the received information.

3) General method: A method in which non-AP MLD requests link (re)selection without additional information based on information acquired through previous Beacon frame, and the like.

1) Solicited Method

Hereinafter, an embodiment of the above-described solicited method may be described.

According to an embodiment, the non-AP MLD may request information for selecting a suitable link to the AP MLD before link change or reconnection. In order to select an appropriate link, the STA may utilize data load information for each AP or capability information of each link (or information on other links).

For example, the capability information for each link may be included in a beacon frame and transmitted periodically.

For another example, the capability information for each link may be optional information, and may not be included in the Beacon frame transmitted every cycle. In order to reduce frame overhead, only information of a link to which a STA is connected or a part of an associated link may be received. Alternatively, if the beacon reception period is long due to the characteristics of the non-AP MLD (for example, a low-power device), the non-AP MLD may not receive capability information for each link for a more suitable link selection.

In the above-described cases, the non-AP MLD may request the latest information of capability information for each link and information for each link of the AP MLD. The link of the capability information for each link and the information for each link may include other links as well as the links for transmitting/receiving. In order to request the latest information on the capability information for each link and the information for each link of the AP MLD, the STA may transmit a request message requesting information necessary for link reselection to the AP.

For example, through the request message, the STA may request the AP by designating necessary specific information. Specific information that can be designated may be changed according to circumstances. That is, the STA may request only information corresponding to a specific link or only information corresponding to a specific capability. In this case, the AP may transmit only information designated by the STA through the response message.

As another example, the STA may request all capability information (for example, other link information) currently possessed by the AP MLD through the request message.

As in the above example, an embodiment for transmitting all information possessed by the AP or an embodiment for transmitting only specific information designated by the STA may be defined/configured in various ways. For example, the AP may transmit all information or designated information based on a separate field or bitmap.

In general, a message requesting information to the AP MLD may be transmitted through a STA that wants to reconnect, but may be transmitted to any STA (that is, another STA) depending on the situation (channel status or link status).

Upon receiving the request message, the AP MLD may transmit a response message (that is, an information message) including the latest information needed for link reselection (for example, data load information for each link, STR capability information between links, and the like) to the non-AP MLD.

The response message may also be generally transmitted through the AP that has received the request message, but may also be transmitted to any AP (that is, other AP) using the multi-link characteristic.

Optionally, the AP MLD may transmit a "recommend link" element that recommends a link suitable for the STA through a response message including the above-described various pieces of information (for example, the latest information required for link reselection).

Hereinafter, the above-described request message and response message may be described as an information request message and an information response message, in order to distinguish them from the request message for link change and the response message for link change.

Based on the information included in the above-described information response message, the STA may reselect an appropriate link and request the AP MLD to change or reconnect the link through a link change request message. The request message for link change may include AP information to be reconnected and link information.

Upon receiving the request message, the AP MLD may transmit a response message of "Accept" when accepting the request. When the AP MLD rejects the request, it may transmit a response message of "decline".

If the request is accepted, the AP may perform Link (re)setup after transmitting the response message, based on the frame exchange through the link of the reselected AP. Conversely, if the request is rejected, the STA may use the existing linked link as it is.

A specific example for the operations of an AP MLD and a non-AP MLD according to the solicited method may be described with reference to FIG. 13.

Figure 13:
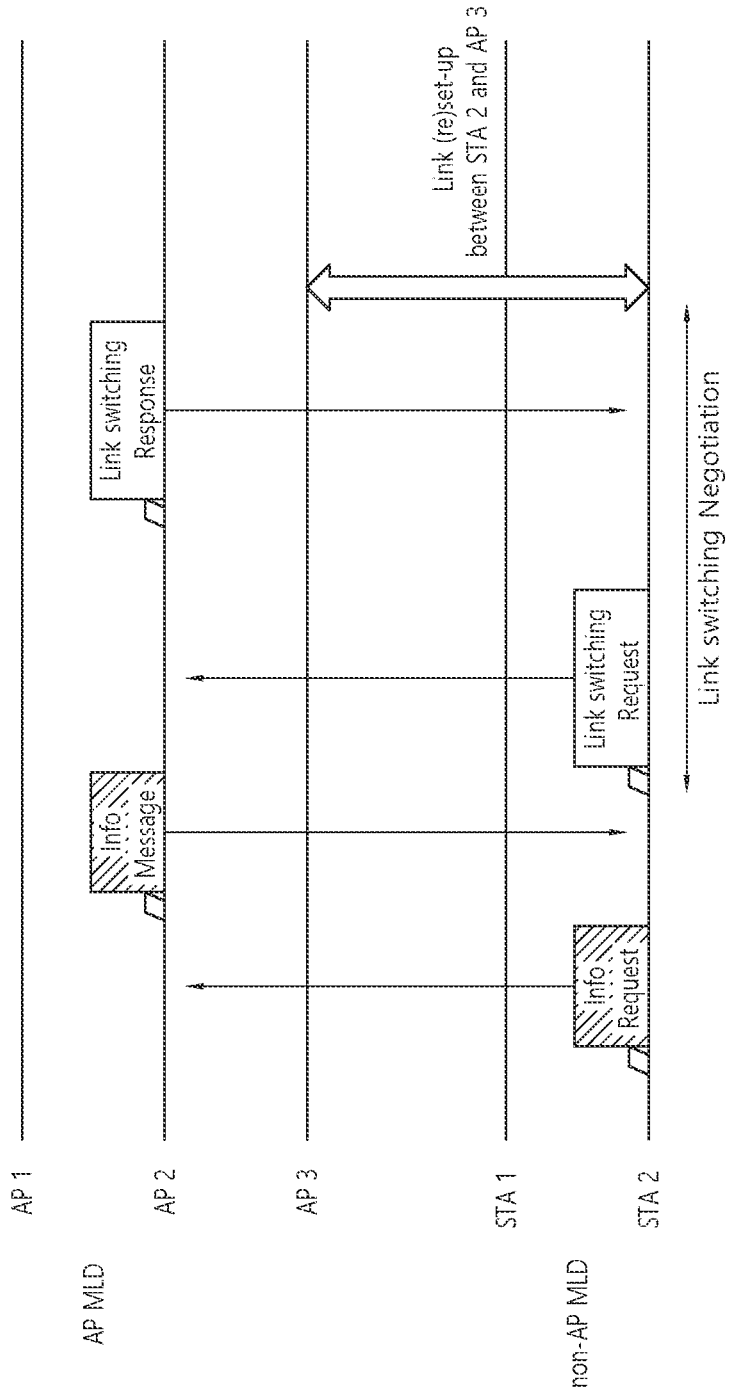
FIG. 13 illustrates the operations of an AP MLD and a non-AP MLD for link change or reconnection.

FIG. 13 illustrates the operations of an AP MLD and a non-AP MLD for link change or reconnection.

Referring to FIG. 13, when STA 2 of the non-AP MLD wants to reselect a connected link, STA 2 may transmit an info request message to the AP MLD through Link 2. Upon receiving this, the AP MLD may transmit an info response message including information necessary for link reselection of the non-AP MLD. Based on the information included in the above-described info response message, STA 2 of the non-AP MLD may transmit a link change request message (that is, a link-switching request frame) to AP 2 of the AP MLD. Thereafter, STA 2 may receive a response message for link change (that is, link-switching request frame) and perform link (re)set-up for link change.

Hereinafter, a new element/field including information for a STA of a non-AP MLD to select a suitable Link may be proposed.

For example, "STA ratio per Link" (element/field) may be proposed. "STA ratio per Link" may include information on the ratio of the number of STAs connected per Link. A specific example may be described with reference to FIG. 14.

Figure 14:
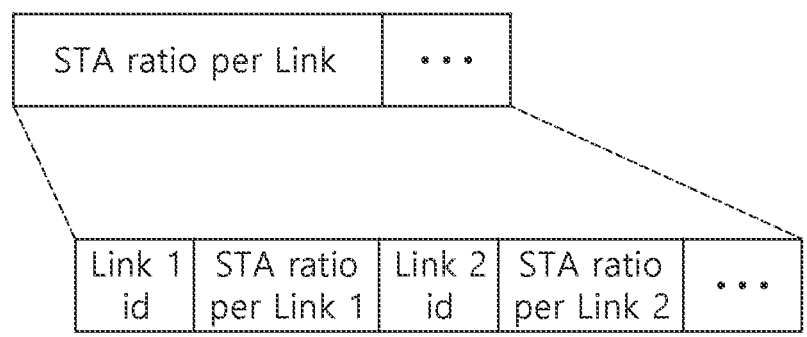
FIG. 14 shows a specific example of STA ratio per Link.

FIG. 14 shows a specific example of STA ratio per Link.

Referring to FIG. 14, the STA ratio per Link (element/field) may include information on the number or ratio of STAs connected to each Link in the entire AP MLD.

For example, if a total of 50 STAs are connected to an AP MLD having 3 links, 10 STAs may be connected to Link 1 and 20 STAs may be connected to Link 2. The AP MLD may transmit information on a value or ratio (%) of information on a STA connected for each link to the non-AP MLD through STA ratio per Link (element/field).

For example, when information on a STA connected for each Link is expressed as a value, Link 1 may be expressed/set as 10 and Link 2 as 20. Accordingly, the value of STA ratio per link 1 may be set to 10. Also, the value of STA ratio per link 2 may be set to 20.

As another example, when information on a STA connected for each Link is expressed as a ratio, Link 1 may be expressed/set as 20 (10/50)% and Link 2 as 40 (20/50)%. Accordingly, the value of STA ratio per link 1 may be set to 20. Also, the value of STA ratio per link 2 may be set to 40.

The above-described example is illustrative, and information on the STA connected for each Link may be set in various ways. In addition to the above-described example, information on a STA connected for each Link may be set as a relative value.

Based on the above-described information on the STAs connected for each link, the STA can check/obtain the number and ratio of STAs connected for each link, and use this as information for link selection.

According to an embodiment, in addition to the above-described "STA ratio per Link" (element/field), various information/element/field may be included in the information response message. For example, the following information/element/field may be included in the information response message.

BSS load information for each AP
STR Capability information between Links
TXOP information for each Link
NAV information for each link
Recommended Link information (that is, "recommend Link" element)
information on connected STA ratio per Link (that is, "STA ratio per Link" element)
etc.

In addition to the above-described information/element/field, various information necessary for link selection may be included in the information response message and transmitted.

After receiving the information as in the above example, the STA may select an AP to be changed or reconnected based on the received information, and then, may transmit a request message for requesting reconnection of the link. Upon receiving the request message, the AP MLD may transmit a response message of "Accept" when accepting the request. When the AP MLD rejects the request, it may transmit a response message of "Decision".

If the request is accepted, the AP can perform frame exchange through the link with the reselected AP after sending the response message. Conversely, in case of rejection, the STA can use the existing connected Link as it is.

2) Unsolicited Method

Unlike the solicited method in which the non-AP MLD directly requests additional information, according to the unsolicited method, the AP MLD can transmit additional information to the non-AP MLD through a beacon frame or a separate frame (For example, a management frame, a PS-Poll frame or a Null frame, and the like) without requesting additional information from the non-AP MLD.

For example, if the beacon period is rather long, the non-AP MLD may lack essential information required for link switching or may not be up-to-date. Accordingly, the AP may transmit a frame including link capability information of the AP MLD to the non-AP MLD. Thereafter, the non-AP STA may acquire the latest information on the capability of each link of the AP MLD.

For example, the changed information may be transmitted to the connected STA whenever the link capability of the AP of the AP MLD is changed. In this case, the STA may maintain the latest information on link capability.

According to the above-described example, since the non-AP STA does not transmit a request message for acquiring a separate link capability, there is an effect that the frame exchange overhead is relatively small compared to the solicited method.

An example of the specific operation of an AP MLD and a non-AP MLD according to the unsolicited method may be described with reference to FIG. 15.

Figure 15:
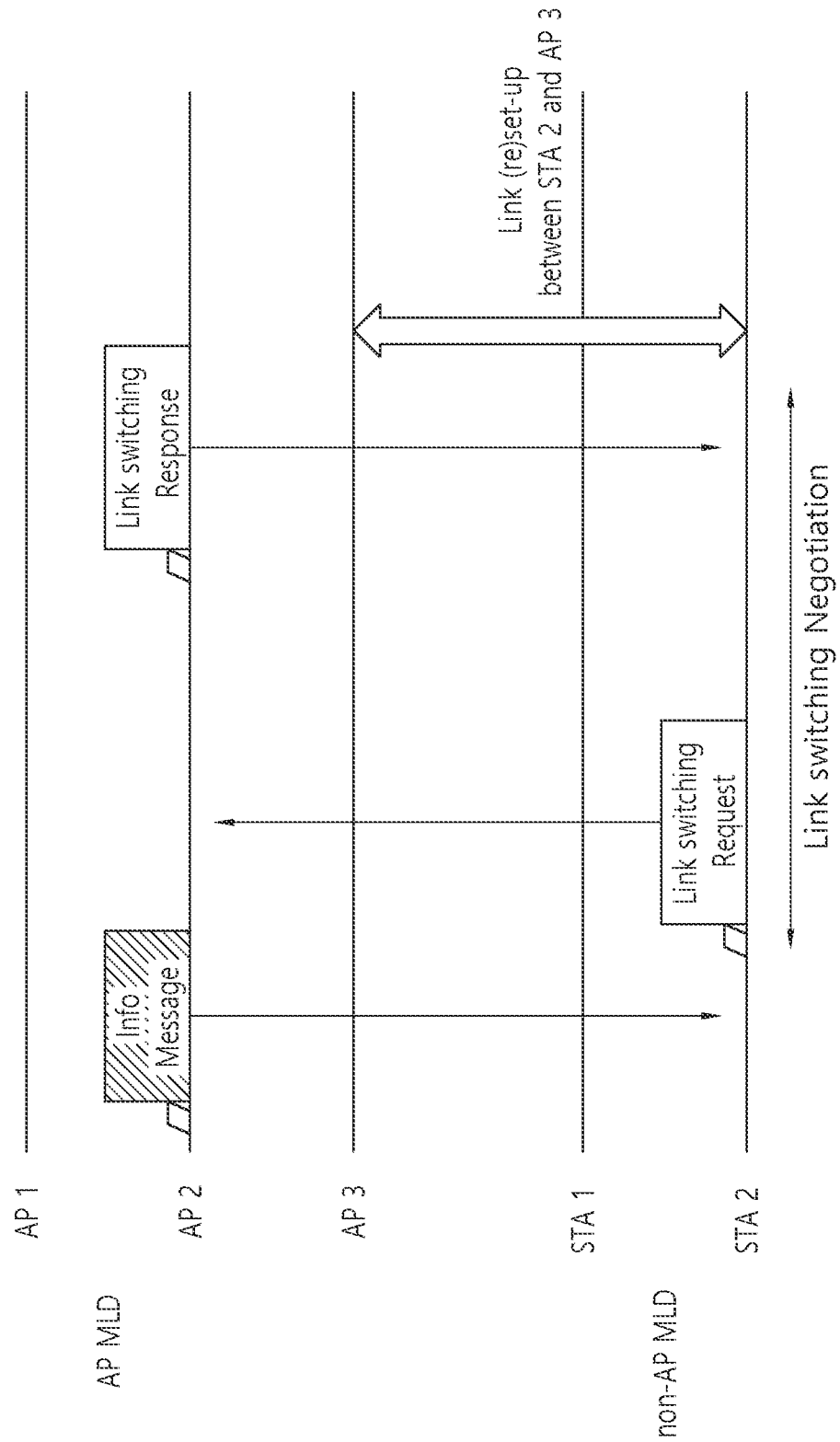
FIG. 15 shows the operations of an AP MLD and a non-AP MLD for link change or reconnection.

FIG. 15 shows the operations of an AP MLD and a non-AP MLD for link change or reconnection.

Referring to FIG. 15, the AP MLD may transmit essential information necessary for link reselection to the non-AP in a separate frame (for example, Info message) without a separate request message from the non-AP MLD.

Therefore, the non-AP MLD can acquire the latest link capability information regardless of the beacon frame period. The non-AP MLD may select an appropriate link during link switching based on the received information. Based on the received information, the STA may reselect an appropriate link and request the AP MLD to change or reconnect the link. The request message may include information on the AP to be reconnected and link information. In addition, the AP MLD receiving this message may transmit a response message of "Accept" when accepting the request, and may transmit a response message of "Decline" when rejecting the request.

If the request is accepted, the AP can perform link (re)setup through frame exchange with the reselected AP's link after sending the response message. Conversely, in case of rejection, the STA can use the existing connected Link as it is.

3) General Method

According to the general method, a non-AP MLD can request a link change or reconnection without requesting additional information based on the information it currently possesses. The information used at this time may include information on the AP MLD and information on the non-AP MLD (for example, STR Capability information for each Link, link state (enable/disable) information, and the like) included in a previously received beacon or a management frame.

Unlike the solicited method, the STA may directly transmit a link change or reconnection request message to the AP MLD without a separate request for information to the AP MLD. The request message may include information on the AP and information on the link to be reconnected. Upon receiving the request message, the AP MLD may transmit a response message of "Accept" w % ben accepting the request, and transmit a response message of "Decline" when rejecting the request.

If the request is accepted, the AP can perform frame exchange through the link with the reselected AP after sending the response message. Conversely, in case of rejection, the STA can use the existing connected Link as it is.

An example for specific operations of an AP MLD and a non-AP MLD according to the general method may be described with reference to FIG. 16.

Figure 16:
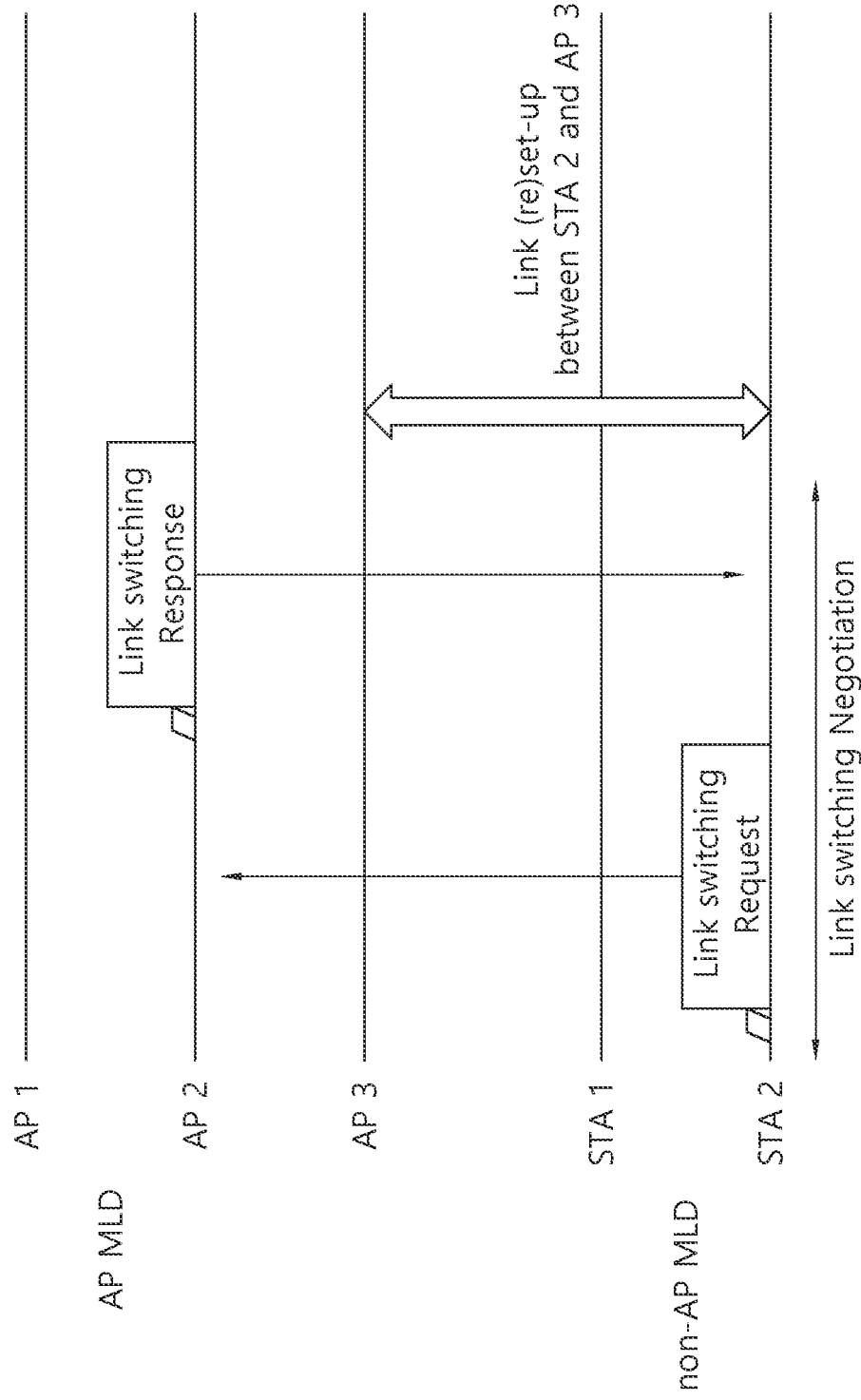
FIG. 16 illustrates the operations of an AP MLD and a non-AP MLD for link change or reconnection.

FIG. 16 illustrates the operations of an AP MLD and a non-AP MLD for link change or reconnection.

Referring to FIG. 16, STA 2 may want to directly change the link in order to guarantee QoS. If STA 2 has previously received information from AP MLD (for example, information received through Beacon frame or Management frame, etc.) or has already determined the link it wants to reconnect, STA 2 may request a link change or reconnection without a separate request for information.

STA 2 may transmit STA information (e.g. STA ID, etc.) and link information to be changed (e.g. Link ID or AP BSS information, etc.) in the Link-switching request frame. Upon receiving the change, the AP MLD may transmit a Link-switching response frame of "acknowledgment" to the STA 3 through the existing Link 2 when accepting the change. Thereafter, STA 2 of the non-AP MLD may be reconnected to the AP 3 after performing a link (re) setup process.

Signaling to Indicate Link Change and Reconnection Method

In order to indicate the methods proposed above, a consensus process through negotiation between an AP MLD and a non-AP MLD may be required. Hereinafter, a signaling method for enabling the methods proposed above will be described.

A new element for indicating a signaling method for indicating a link change and reconnection method may be defined. Signaling using a new element may occur during multi-link setup or after multi-link setup. The new element may be included in an existing (re)association frame or a new frame.

IOM (Information Obtain Method) Capability

IOM Capability Element: The IOM Capability Element may include information related to whether to enable the additional information acquisition method for multi-link selection described in this specification. That is, the IOM may refer to a method of exchanging information for each link for link selection, which is described in this specification. For example, when an TOM capability value is present in an element of a message in a process (for example, capability negotiation process) in which the AP MLD and the non-AP MLD exchange messages for operation agreement in the multi-link setup process, the message sender may mean supporting IOM capability. The fact that the AP MLD has IOM capability may mean that the AP knows information on other APs (that is, other APs in the AP MLD to which the AP belongs) by being shared internally. If the information on other APs is not shared with MLD, there is no IOM capability. For example, if the IOM Capability value is 1, it may mean that the information exchange method for multi-link selection is activated and that it operates with the indicated function. Conversely, if the IOM Capability value is 0, it may mean that the information exchange function for multi-link selection is deactivated.

The IOM Capability element may include the following field values to indicate various operations. However, the field value added below may be different depending on when the AP MLD requests a link change (that is, an embodiment in which the AP MLD requests a link change or reconnection) and when the non-AP MLD requests a link change (that is, an embodiment in which the non-AP MLD requests a link change or reconnection).

- Method field: Indicate the operation method of IOM. When the Non-AP MLD activates the TOM method to obtain information from the AP, the method to be used may be selected and indicated from among the methods suggested above (for example, the solicited method, the unsolicited method, the general method, etc.). For example, if the value of the Method field is 0, it may be related to the Solicited method, if it is 1, it may be related to the Unsolicited method, and if it is 2, it may be related to the General method. For example, the Method field may be 1 bit and may be indicated as 0: Solicited Method 1: Unsolicited method.
- Info range field: Information related to the range of information provided may be included. For example, when the value is 0, it may mean only some information, if it is 1, it may represent all information.
- Link condition field: A field indicating a specific link being requested. When the STA wants to receive only specific link information from the AP, the corresponding field can be used. A link from which the STA wants to receive information may be indicated by a link identifier (for example, Link ID, BSS ID, etc.). For example, when a STA connected to Link 1 wants to request only information on Link 2 and Link 3 from the AP, link 2 and link 3 (corresponding link ID) may be displayed in the link condition field and transmitted to the AP. Here, when the information range field value is 1, the receiving STA may deliver all information values corresponding to link 2 and link 3, and when the value of the information range field is 0, the receiving STA may transmit only some information specified and requested by the transmitting STA. Some information designated by the transmitting STA may be determined through the Info condition field below. However, if the receiving STA does not have an information condition field value or is 0, it may be determined that there is no link condition, and all link information may be provided to the STA.
- Info condition field: A field indicating a specific type of information requested by the transmitting STA. When the transmitting STA wants to receive only specific information from the receiving STA (for example, AP), the corresponding field may be used. The information condition field can be used only when the info range field is set to 0. For example, information requested by the STA (for example, BSS Load, STR Capability, etc.) may be displayed as a bitmap. The type of information provided by the AP, the instruction method in the bit, or the order may be specified later. The information condition field may be used together with the link condition field mentioned above, and may include request information on various conditions through various combinations.
- Other fields may be added later.

The MLD may indicate whether to use the IOM function (that is, information exchange operation for link change or reconnection) by using the IOM capability element. Whether to use the IOM function can be agreed upon in the negotiation phase between the AP MLD and the non-AP MLD in the multi-link setup process, and can be updated through a separate message exchange after multi-link setup is completed.

If the IOM function is used, it may operate based on the contents described in the embodiment for link change and reconnection.

For example, the IOM Capability element transmitted by the non-AP MLD in the multi-link setup process may include Method field=0, Info range field=1, an agreement may be made with the AP MLD based on the IOM Capability element. After multi-link setup, non-AP MLD can operate as a solicited method (based on Method field=0), when requesting link information, the non-AP MLD may request all information included in the beacon (based on Info range field=1). Therefore, AP MLD provides link information as a response message only when a request message is received from the STA (Solicited method), when the request message is received, the AP MLD may transmit, to the STA, a response message including information on all links in the AP MLD and all information included in the beacon.

For example, the IOM Capability element transmitted by the non-AP MLD may include information related to Method field=1, Info range field=0, Link condition: Link id 2, and Info condition field: BSS Load. For example, in the Info condition field, BSS Load may be indicated through a bitmap. The non-AP MLD may agree with the AP MLD based on the IOM Capability element. After multi-link setup, the non-AP MLD may operate in an unsolicited method, and the AP may transmit the BSS load information of Link 2 to the STA as a separate message without a separate request message.

The AP MLD and the non-AP MLD can activate the proposed IOM method through the signaling method proposed in the present disclosure during multi-link setup or after multi-link setup, and can limit the range and type of requested information through various field values in the IOM Capability element.

As described above, although the IOM operation may be performed after accurate operation negotiation between MLDs through such an IOM signaling method in the standard, the present specification may also consider a case in which the IOM method operates by the MLD implementation without a separate signaling process. This may mean that the AP MLD and non-AP MLD are operated by the implementation of the AP MLD or the implementation of the non-AP MLD without negotiation.

When the MLD performs the IOM operation without a separate signaling exchange, the following restrictions may occur.

1) Restrictions on the solicited method: If information sharing is not supported between APs in the AP MLD, the STA cannot respond to a request for information on another link.
2) Restrictions on the Unsolicited method: The AP determines by itself the STA that needs additional link information (for example, beacon period, etc.) and provides a separate message. Therefore, the STA cannot predict in advance whether it will receive this information.

If the MLD implements the IOM without a separate signaling method, the operation process may be simplified, but there may be the above-mentioned limitations.

Embodiments for Anchored Link Change and Reconnection

According to an embodiment, the AP MLD may support an anchored link. When the AP MLD supports an anchored link, there are additional considerations in the above-described embodiment for link change and reconnection.

The AP MLD may support one or more anchored links, and may provide information on one or more anchored links to the non-AP MLD through the anchored link list information/element. Non-AP MLD can be used by selecting one or more Links from among these Anchored Link Lists as its own Anchored Link. Links other than those selected as anchored links can operate as non-anchored links.

Anchored Link and non-Anchored Link have a trade-off relationship in terms of power consumption and data load. That is, if the non-AP MLD uses one anchored link, power consumption can be reduced, but it may be difficult to guarantee data transmission QoS (especially data for beacon and management frame). Conversely, if multiple anchored links are used, data transmission QoS can be guaranteed, but the amount of power reduction can be reduced.

Therefore, the non-AP MLD must be able to dynamically request reselection for the anchored link for efficient data exchange. Therefore, below, an embodiment for dynamically requesting an anchored link change/reselection by a non-AP MLD may be proposed.

First, an MLD structure supporting an anchored link may be described with reference to FIG. 17.

Figure 17:
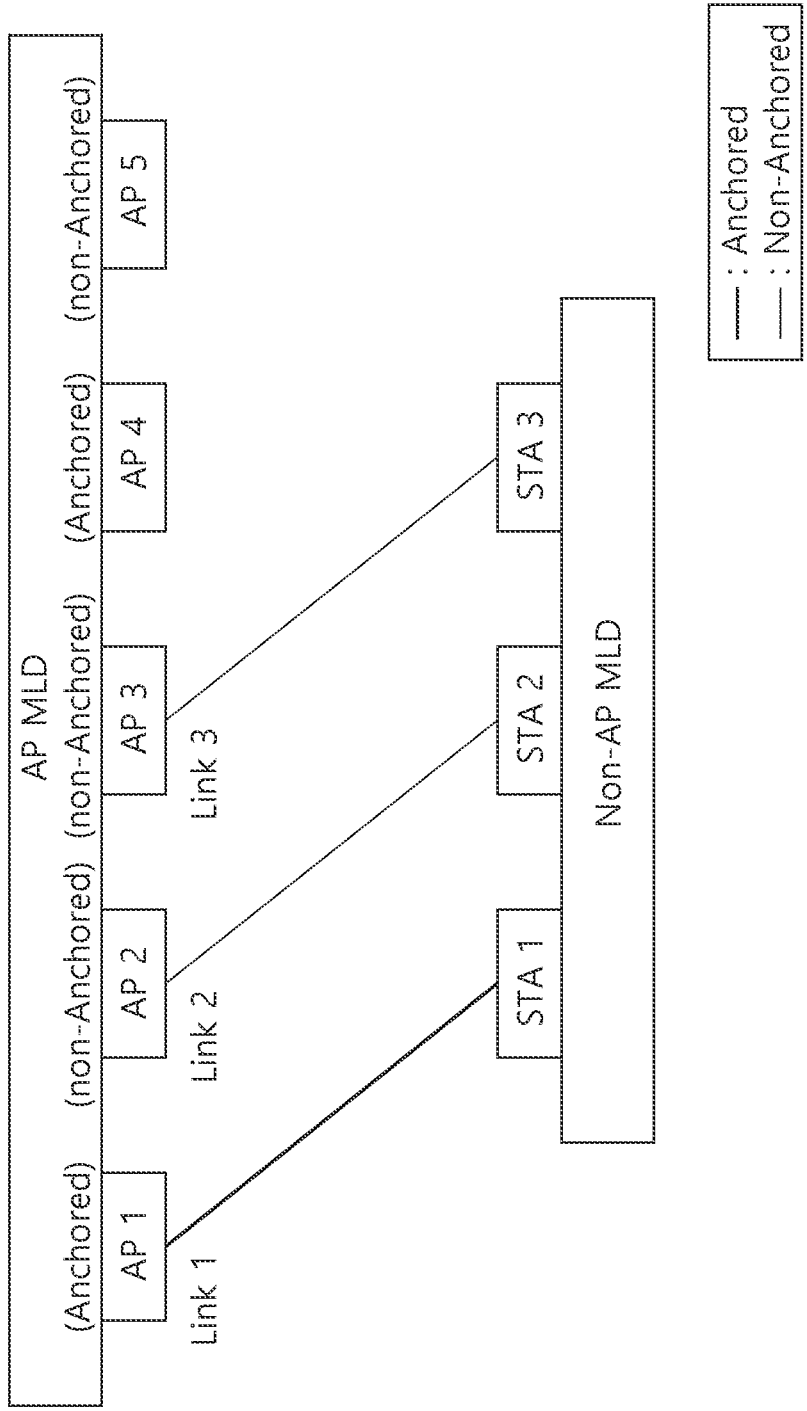
FIG. 17 shows an example of an MLD structure supporting an anchored link.

FIG. 17 shows an example of an MLD structure supporting an anchored link.

Referring to FIG. 17, the AP MLD may use two Links (that is, AP 1 and AP 4) as anchored links, among five Links. Non-AP MLD can use one anchored link by selecting Link 1 among two links used as anchored links. The remaining Links of Non-AP MLD can be connected to non-Anchored Links (Link 2, Link 3). That is, non-AP MLD must always monitor Link 1 to receive the Beacon and management frame.

According to an embodiment, STA 1 may request to change the anchored link previously used to the anchored link of AP 4 instead of the anchored link of AP 1 for reasons such as load balancing. In order to change the anchored link, the above-described embodiment related to link switching may be applied.

However, anchored links are limitedly supported by some of the links supported by AP MLD. Accordingly, the AP MLD may have a separate Anchored Link List. The non-AP MLD (or STA) must select one of the links included in the Anchored Link List and request a change or reconnection. In addition, since the non-AP MLD must have at least one anchored link, when requesting link change or reconnection, the anchored link change must be requested in consideration of this.

For the above-described embodiment, the AP MLD must additionally provide "Anchored Link List" information to the non-AP MLD. This may be included in the frame in the form of a new element or field. The name of the above-mentioned "Anchored Link List" is an example and may be set/expressed in various ways.

"Anchored Link List" (element/field): List information of anchored links currently supported by AP MLD. For example, list information of anchored links currently supported by AP MLD may be indicated/set by one or more Link IDs or AP BSS values. Non-AP MLD must be connected to at least one anchored link among the links included in the list.

The above-described information (for example, "Anchored Link List" (element/field)) can be transmitted by being included in the existing Beacon or management frame, or included in the Info response message in the case of the above-described Solicited method and transmitted to the non-AP MLD.

Therefore, when the non-AP MLD requests to change the anchored link used by the non-AP MLD, the non-AP MLD must know in advance the currently supported anchored link list information. If you do not know the Anchored Link List information or want to obtain the most up-to-date information, you can obtain it from AP MLD in the solicited method.

Based on the Anchored Link List information, the STA may request a change or reconnection to only one Link in the Anchored Link List. If a change or reconnection is requested to another link not included in the list, the AP MLD may transmit a rejection message to the STA.

When changing or reconnecting an anchored link, there are additional considerations in addition to the existing link change method. The case where the STA of the non-AP MLD changes the anchored link can be largely divided into two types.

The first is a case where a STA that is already connected to an anchored link changes to another anchored link in AP MLD for reasons such as load balancing (change of AP for anchored link). The second is a case where the STA connected to the anchored link is disabled for reasons such as power state, and another STA in the non-AP MLD is reconnected to the anchored link (STA change for Anchored Link).

The first case may operate similarly/samely to the above-described embodiment for link change and reconnection. However, when reselecting a link, the STA should select from the links in the Anchored Link List supported by the AP MLD. If another link is selected, the AP MLD may transmit a rejection response message.

The second case requires additional consideration. An example for the second case can be described with reference to FIG. 18.

Figure 18:
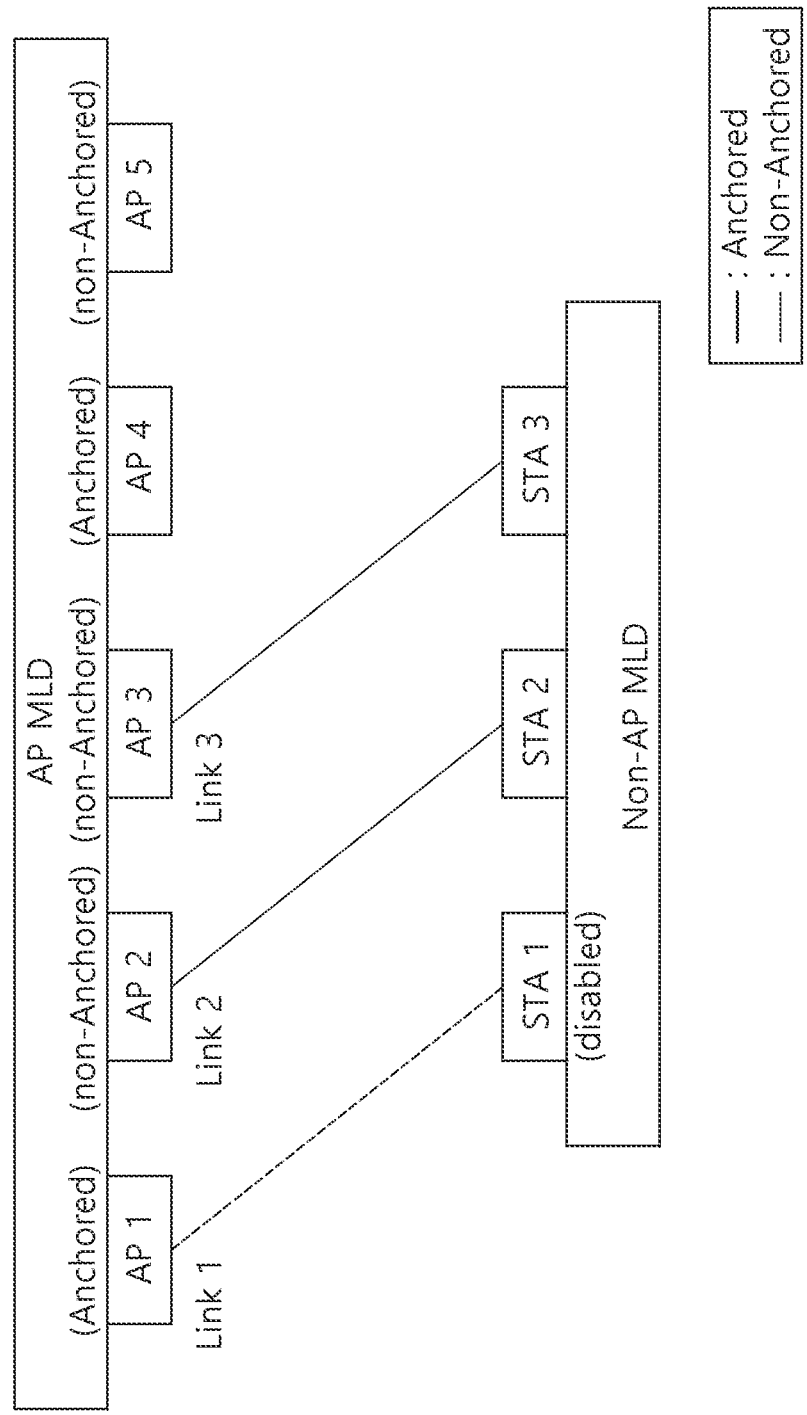
FIG. 18 illustrates an example of a situation in which an anchored link change or reconnection is required.

FIG. 18 illustrates an example of a situation in which an anchored link change or reconnection is required.

Referring to FIG. 18, in the STA of non-AP MLD, the state of STA 1 could be disabled for various reasons (for example, power off, etc.). At this time, since both STA 2 and STA 3 are currently connected to the non-anchored link, one of the STAs should be reconnected to the anchored link.

As shown in FIG. 18, if the non-AP MLD needs to reconnect the anchored link, the non-AP MLD may attempt to reconnect one of STA 2 and STA 3 to the anchored link.

For example, if the non-AP MLD knows information about the Anchored Link List supported by the AP MLD, a non-AP MLD may request a link change by selecting an appropriate link.

For another example, if the non-AP MLD does not have information about the Anchored Link List supported by the AP MLD, the non-AP MLD may request a link change by selecting an appropriate link after obtaining information from the AP MLD through an Info request.

An example of specific operations of AP MLD and non-AP MLD according to the above-described embodiment may be described with reference to FIG. 19.

Figure 19:
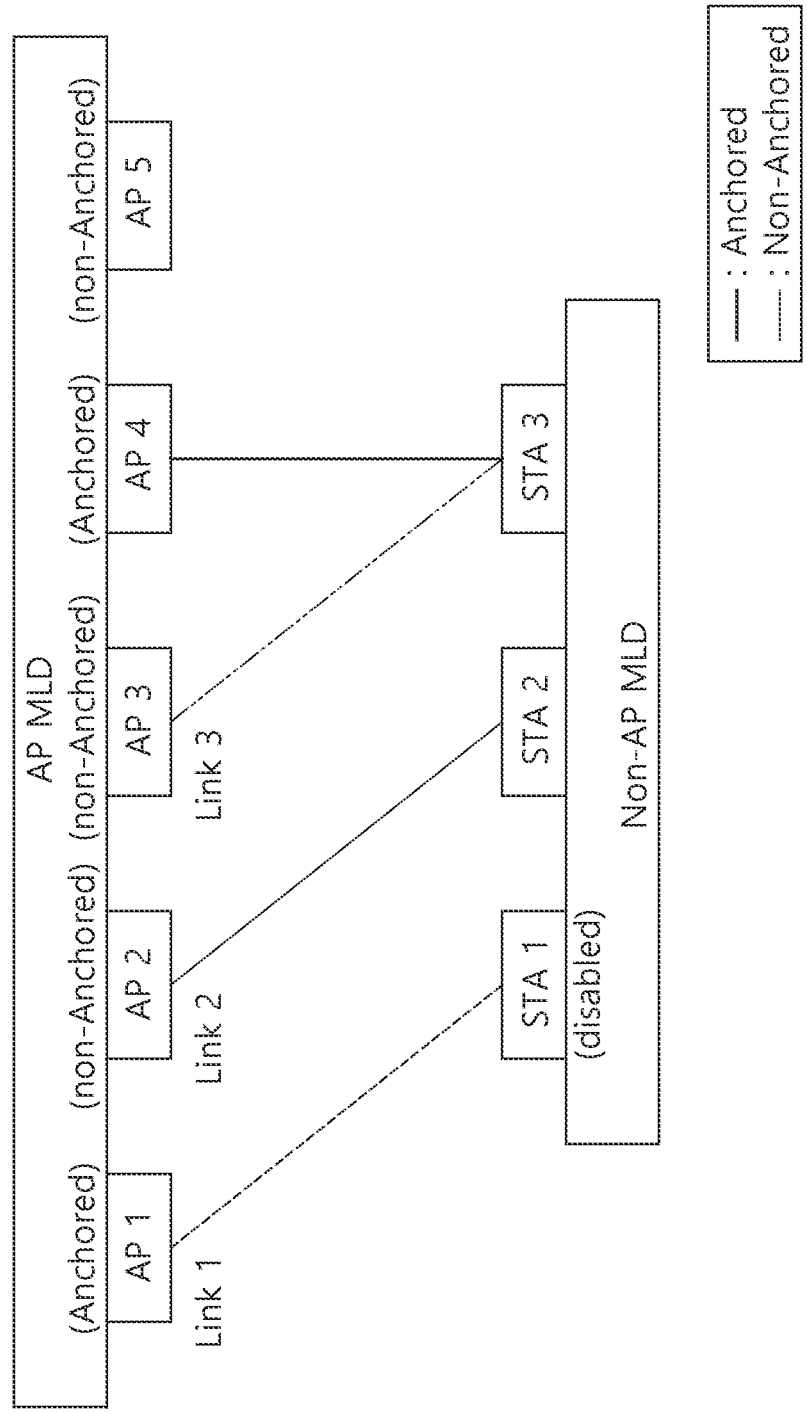
FIG. 19 illustrates the operations of an AP MLD and a non-AP MLD for anchored link change or reconnection.

FIG. 19 illustrates the operations of an AP MLD and a non-AP MLD for anchored link change or reconnection.

Referring to FIG. 19, when STA 1 connected to the anchored link is disabled, a non-AP MLD requires a new Anchored Link connection. In this case, the non-AP MLD may disconnect the non-anchored link connection with the AP 3 previously connected to the STA 3 and try to reconnect with the anchored link.

For example STA 3 may attempt to connect to AP 1 used as an existing anchored link. For another example STA 3 may attempt to connect to a new AP 4 based on various pieces of information.

The process of selecting a new anchored link may be performed in the same way as/similarly to the above-described embodiment for link change or reconnection. For example STA 3 may request reconnection by selecting an anchored link recommended by an AP or directly selecting an anchored link by STA 3. After completion of the anchored link reconnection, the link of STA 3 may operate as an anchored link.

Element/Field Containing Information about the Anchored Link

According to an embodiment, when information about an anchored link supported by AP MLD is changed or a STA directly requests information about an anchored link, the AP MLD may transmit the information (that is, information about the changed anchored link or information about the anchored link requested from the STA) to the non-AP MLD.

For example, the information may be transmitted by being included in the Beacon frame as information related to the anchored link currently being used, or may be transmitted by being included in a separate Management frame.

The information on the anchored link may include an "Anchored Link List" element indicating an anchored link supported by the above-described AP MLD and information on whether or not an anchored link is used for each STA of the non-AP MLD.

Hereinafter, new elements including information on the above-described anchored link may be proposed. Newly proposed elements may be configured/set as follows.

1) "Anchored Link Indication" element (or field): The "Anchored Link Indication" element may include information on whether to use the anchored link for each STA connected to the AP MLD. That is, the "Anchored Link Indication" element may be an element/field indicating whether an anchored link is used or not for each link of non-AP MLD or for each STA.

2) "STA ratio (count) per Anchored Link" element (or field): The "STA ratio per Anchored Link" element may include information on the ratio or number of STAs connected for each anchored link. However, only STAs using the Link as an anchored link may be considered. In other words, even if AP MLD supports the first link as an anchored link, a STA that uses the first link as a non-anchored link may not be included in the STAs connected for each anchored link.

3) "STA count for anchor link": The number of STAs that use the link as an anchor link among STAs connected to the AP.

According to an embodiment, the elements may be included as additional information in a frame, if necessary, in all processes of the embodiment for changing or reconnecting the anchored link described above.

A specific example of the elements may be described with reference to FIG. 20.

Figure 20:
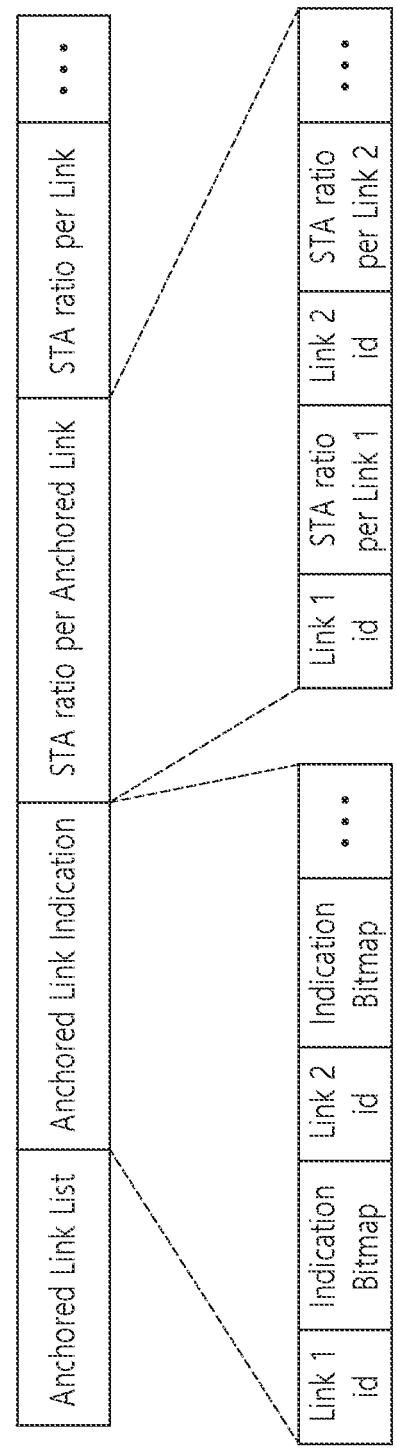
FIGS. 20 and 21 show specific examples of elements for anchored link reconnection.
Figure 21:
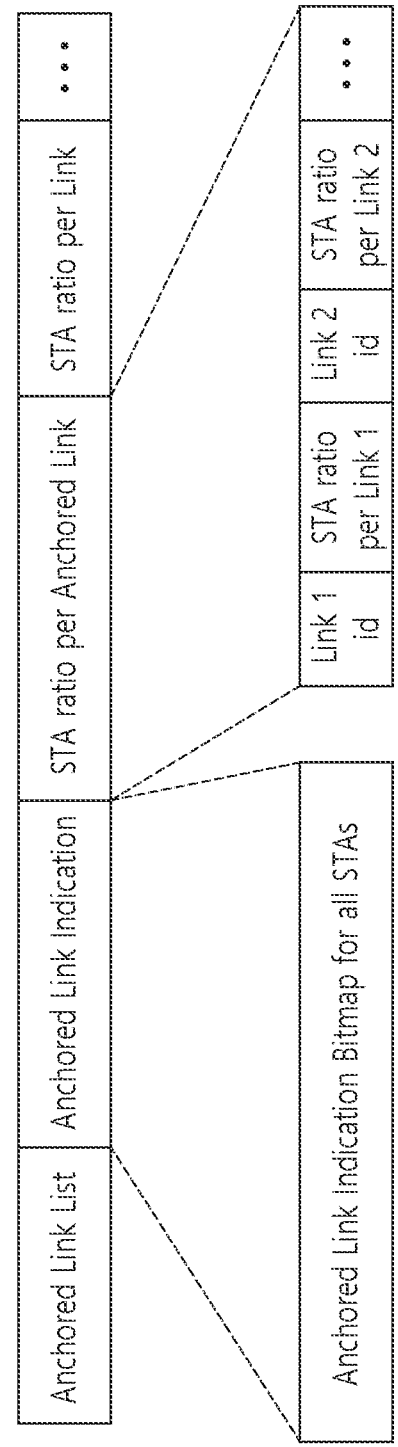

FIGS. 20 and 21 show specific examples of elements for anchored link reconnection.

Referring to FIGS. 20 and 21, information on the anchored link may be transmitted through an Anchored Link List element (or field), an Anchored Link Indication element (or field), and/or a STA ratio per Anchored Link element (or field). In other words, the element for Anchored Link reconnection may include an Anchored Link List element (or field), an Anchored Link Indication element (or field), and/or a STA ratio per Anchored Link element (or field).

According to an embodiment, the Anchored Link List element may include link list information currently supported by the AP MLD as described above. For example, link list information currently supported by the AP MLD may be indicated based on Link ID or AP BSS information. In other words, a list of Links currently supported by AP MLD may be configured/set based on Link ID or AP BSS information.

According to an embodiment, the Anchored Link Indication element may include information on whether to use the Anchored Link for each STA of the non-AP MLD. For example, information on whether to use an anchored link for each STA of non-AP MLD may be indicated/displayed through an indication bitmap for each link. (FIG. 20) Another example, through one bitmap, whether to use the anchored link for all STAs may be indicated/indicated. (FIG. 21)

As an example, when information on whether to use an anchored link is indicated by an indication bitmap according to the link ID, the STA may check the current anchored link based on the value of the anchored link list element. Accordingly, the STA can check the ratio of STAs connected to each anchored link. In this case, the indication bitmap field for the non-anchored link may be omitted to reduce overhead.

If the value of one bit in the Bitmap is 1, the one bit may mean that a link currently connected to the STA is an anchored link. If the value of one bit in the Bitmap is 0, the one bit may mean that the link currently connected to the STA is a non-anchored link. An embodiment in which a bitmap is used to indicate the presence or absence of an anchored link connection for each STA is an example, and information on whether or not an anchored link connection is used for each STA may be transmitted through various embodiments.

According to an embodiment, the ratio of STAs may be transmitted for all links supported by the AP MLD. According to an embodiment, the STA ratio per Anchored Link element may include information on the usage ratio or number as an actual anchored link of a STA for each anchored link. For example, since the information is displayed only for the Anchored Link indicated/indicated in the Anchored Link List element, there is an effect of reducing overhead.

An example in which the value of the STA ratio per Anchored Link element is set may be described below.

For example, the AP MLD may include five APs (that is, AP 1 to AP 5), and AP 1 may be connected to STAs through link 1. AP 2 may be connected to STAs through link 2. AP 3 may be connected to STAs through link 3. AP 4 may be connected to STAs through link 4. AP 5 may be connected to STAs through link 5.

AP MLD may support two links among five links (that is, link 1 to link 5) as anchored links. Link 1 and link 4 may be supported/used as an anchored link.

A total of 10 STAs are connected to Link 1 (or AP 1), and there may be 7 STAs using Link 1 as an anchored link. If it is expressed as a ratio, it may be expressed/expressed as 70%, and if it is expressed as a value, it may be expressed/expressed as 7.

A total of 20 STAs are connected to Link 4 (or AP 4), and there may be 5 STAs using Link 4 as an anchored link. If it is expressed as a ratio, it may be expressed/expressed as 25%, and if expressed as a value, it may be expressed/expressed as 5.

The STA ratio per Anchored Link element is transmitted together with the above-described STA ratio per Link element information, so that more accurate information can be transmitted to the STA. In general, since an anchored link may have relatively more data traffic than a non-anchored link, the STA ratio per anchored link element may be used as useful information for a STA reselecting an anchored link.

Also, this information may be transmitted for each link.

FIG. 22 is a diagram illustrating an embodiment of a BSS load element in consideration of an anchor link.

Referring to FIG. 22, the BSS load element may include a field related to the number of STAs operating in the anchor link. Since the non-AP MLD receiving the BSS load element can know the number of STAs using the corresponding link as an anchor link among STAs connected to the AP, the BSS load element can be used as an indicator of anchor link selection.

FIG. 23 is a diagram illustrating an embodiment of a BSS load element in consideration of an anchor link.

Referring to FIG. 23, the BSS load element may include link information for each link identifier according to multi-link characteristics. For example, the BSS load element may include a plurality of Link information, include link information of Link 1 in fields subsequent to the field related to Link ID 1, include link information of Link 2 in fields subsequent to the field related to Link ID 2.

Based on the above-mentioned information (or elements), the non-AP MLD may check whether the link to which it is connected is an anchored link, the connection ratio of STAs for each anchored link, and the ratio in which the anchored link is actually used.

Additionally, when AP MLD transmits information on other links, that is, all links through the above elements, the STA may check the connection ratio and actual usage ratio for each STA for all anchored links of the AP MLD, based on one frame. Accordingly, the information (or elements) may be utilized when reselecting an anchored link to be used by the STA.

Therefore, according to the embodiment for Anchored Link change or reselection, by using the information on the above-described anchored link (for example, BSS Load information for each AP or STR Capability information for each Link, etc.) as well as various link information used in the embodiment for link change or reselection (for example, Anchored Link list information, Anchored Link usage indication information for each STA, or Actual STA usage ratio information for each Anchored Link, etc.), there is an effect of performing more suitable anchored link change or reconnection.

New Field Considering Single Link Device

Hereinafter, an embodiment in consideration for a Single link STA (e.g. legacy STA) will be described.

Since a single link STA has only one link, when connected to an AP, one link may operate the same as an anchor link of the MLD. In other words, the single link STA may perform monitoring and BSS operation on one link in which it operates.

Therefore, from the AP's perspective, since the single link STA is the same as the STA operating in the anchor link of the MLD, if the non-AP MLD can know the number of single link STAs connected to the AP when the non-AP MLD selects the anchor link, the non-AP MLD may determine the number of STAs using the link of the corresponding AP as an anchor link.

Single link STA and multi-link STA can coexist in 11be network environment. When a non-AP STA wants to connect to an AP or AP MLD, if it informs the number of single link STAs connected per BSS, the STA can prevent single link STAs from being clustered and connected to one BSS. Accordingly, overall load balancing can be improved. Therefore, information on the number of single link STAs connected per BSS can be used as an indicator when the non-AP MLD selects an anchor link, as well as when a STA or anon-AP MLD selects and changes a link for load balancing.

The above-mentioned single link STA may be defined in various ways according to the capability of the STA.

Basically, a single link STA may mean a legacy device (for example, 11n, 11ax device, etc.) of the previous standard that does not support multi-link. In addition, in the case of a device supporting only single radio (for example, multi-link single radio (MLSR)STA) among EHT non-AP MLDs supporting multi-link, this may be defined as a single link STA. The MLSR STA may support multi-links and may change an operation link, but may refer to a terminal capable of transmitting/receiving only one link at a time. Although the MLSR STA supports multi-link, it may be included in the single link STA of the present specification for the convenience of description. Alternatively, a single link STA may be defined to include both a legacy device and an EHT single radio device.

Therefore, in the example of the present specification, because the number of single link STAs connected per BSS may vary depending on the range (that is, definition) included in the above single link STAs, the definition of a single link STA is divided and a field is additionally defined. According to the above-mentioned various definitions of single link STA, a new field is further defined in detail, based on this, embodiments of various elements that can be combined are described.

The new fields to be defined are as follows. A field may be added to more accurately distinguish the meaning of a single link STA.

Single Radio (SR) STA count with Single Link (SL): The number of EHT devices supporting Single radio among the number of STAs currently associated with the AP. The EHT device may refer to a device supporting the EHT wireless LAN system (that is, IEEE802.11be).

Legacy STA count with Single Link (SL): The number of legacy devices among the number of STAs currently connected to the AP. Tat is, the number of STAs supporting the pre-EHT WLAN system that does not support multi-link.

STA count with single link (SL): the number of single link STAs among the number of STAs currently connected to the AP. Here, the single link STA includes both a legacy device and an EHT device supporting single radio.

STA count with multi link (ML): The number of STAs in non-AP MLD supporting multi-link among the number of STAs currently connected to the AP.

The number of STA counts of the existing BSS load element is equal to the value obtained by adding the STA count with multi link value to the STA count with single link value according to an example of the present specification. Therefore, if only one field value of STA count with single link or STA count with multi link is known, the other field value can be calculated, so that one of the two fields may be omitted.

For example, the field related to the single link STA described above may be included in the BSS load element. The BSS load element may include only one of the fields suggested above, or may include two or more fields in various combinations as needed.

FIG. 24 is a diagram illustrating an embodiment of a BSS load element including information related to a single link STA.

Referring to FIG. 24, the BSS load element may include information related to a Single Radio STA. For example, the AP MLD may inform the non-AP STA of the number of EHT Single radio STAs (for example, MLSR STAs) connected for each BSS. Since the single radio EHT non-AP MLD has only one radio, it is difficult to expect all the benefits due to the multi-link of the existing MLD. Single radio EHT non-AP MLD may not distribute data traffic like other MLDs due to limited radio capability. Therefore, the AP MLD can improve the load balancing by delivering information about the single radio EHT non-AP MLD to the STA so that the EHT single STA is distributedly associated with the BSS.

FIG. 25 is a diagram illustrating an embodiment of a BSS load element including information related to a single link STA.

Referring to FIG. 25, the BSS load element may include information related to the legacy STA. For example, the AP MLD may inform the number of Legacy STAs (that is, Devices) associated with each BSS. In 11be, the MLD environment is considered, and as a result, the network will be a network environment where devices supporting multi-link and legacy devices that do not support multi-link coexist. Because the legacy STA cannot recognize the information of the MLD, the EHT non-AP MLD can recognize the information of the legacy STA to improve load balancing. Legacy STA will connect to the BSS that is advantageous to it based on existing technology. In this case, when the EHT AP MLD informs the EHT non-AP MLD of the number of legacy STAs connected for each BSS, the EHT non-AP MLD may select or change a link in consideration of this. The existing legacy STAs cannot obtain this information, but since the EHT non-AP MLD can be connected by avoiding BSS with many legacy STAs, it can be useful information for load balancing.

The reason for distinguishing it from the EHT Single radio STA is that the EHT Single radio STA is a device that communicates with only one radio but does not use a fixed link but has semi-static characteristics, thus it is possible to utilize the characteristics of multi-link through dynamic multi-link switching as needed. Therefore, a field for the legacy STA Count that can be more critical to data traffic congestion can be configured separately.

FIG. 26 is a diagram illustrating an embodiment of a BSS load element including information related to a single link STA.

Referring to FIG. 26, the BSS load element may include both information related to a single radio STA and information related to a legacy STA. For example, the BSS load element may include both the above-mentioned information on the number of EHT Single Radio STAs and information on the number of legacy STAs. The STA that has received the BSS load element may use only critical information to itself according to its capability or network condition. For example, when the EHT Single radio STA does not support the semi-static characteristic (that is, when only a single link is used), it is critical for data traffic because it is similar to the characteristics of legacy devices that use only one link. If the EHT Single radio STA supports the semi-static characteristic (that is, when using multi-link), since multi-link switching can be performed as needed, data traffic may not be as critical as existing legacy devices. Even if a single radio STA can dynamically change the link, because of the overhead (for example, (re)association, switching time gap, etc.) that occurs at that time, depending on the technology to be developed later, the degree of criticality on link data traffic congestion may vary. Therefore, the STA that wants to connect or change the link may utilize the SR STA Count with SL information depending on how critical the single radio (SR) STA Count with single link (SL) information is to itself, otherwise, it may skip this information.

FIG. 27 is a diagram illustrating an embodiment of a BSS load element including information related to a single link STA.

Referring to FIG. 27, the BSS load element may include information related to a single link STA. For example, the aforementioned legacy STA count with SL information and SR STA count with SL information may be included in one field. Station with SL may mean both a Legacy STA and an EHT Single radio STA. Therefore, the sum of the number of single radio STAs and the number of legacy STAs can be expressed as one field, Station Count with SL, as described above.

After completion of multi-link setup or multi-link setup based on new field information (that is, Station count with single link), in the process of selecting or changing a link, the non-AP MLD can distribute multiple data loads by selecting a link in consideration of the number of single link STAs connected to the link. In addition, when EHT non-AP MLD is in Power save mode, since it has similar restrictions to the existing single radio STA when using an anchor link, this information can also be used during multi-link setup or in the process of selecting or changing anchor links afterward.

The BSS load element may include the above information for each link identifier according to the multi-link characteristic.

FIG. 28 is a diagram illustrating an embodiment of a BSS load element including information related to a single link STA.

Referring to FIG. 28, multi-link information may be transmitted in one frame. For each Link ID, fields such as Element ID, Length, Station Count, SR STA Count with SL, Channel Utilization, and Available Admission Capacity may be included. In the embodiment of FIG. 28, only the Station count with SL field is shown among the fields related to the Single link STA, however, all of the fields mentioned in FIGS. 24, 25, and 26 may be included in one frame. That is, information on all APs (that is, BSS) of the AP MLD may be transmitted through one link.

The field defined above may be included in a separate new element or defined as a new field of an existing element. The BSS load element may be included in a management frame (for example, beacon) or included in a separate response message transmitted by the AP at the request of the STA.

New Field Proposal Considering Multi-Link Device

In the existing 802.11 standard, BSS load element information is defined to inform the load status of each BSS.

FIG. 29 is a diagram illustrating an embodiment of a BSS load element.

Referring to FIG. 29, each field information included in the BSS load element is as follows.

Station Count: The total number (unsigned integer) of STAs currently associated with the corresponding BSS.

Channel Utilization: Percentage of time that medium sensed by the AP is busy. For example, the AP may detect when the medium is busy by means of a physical or virtual carrier sense mechanism.

Available Admission Capacity: A field (unsigned integer) indicating the amount of remaining medium time available through explicit admission control.

The 11be standard defines a multi-link device in which a device supports multiple links. That is, when an AP has multiple links, it is called an AP MLD, and when a non-AP STA has multiple links, it is called a non-AP MLD. Alternatively, the AP MLD may include a plurality of APs, each AP may have only one link, and the non-AP MLD may also include a plurality of non-AP STAs and each non-AP STA may have only one link. In this case, that the AP MLD may have multiple links means that one AP MLD logically has several AP entities, which means that each AP entity of the AP MLD may have its own BSS. Therefore, when the non-AP MLD performs multi-link setup with the AP MLD, each AP entity of the AP MLD has an independent BSS and may perform link setup for each BSS. An embodiment of such a multi-link setup process is as follows.

FIG. 30 is a diagram illustrating an embodiment of a multi-link setup method between MLDs.

Referring to FIG. 30, for example, when a non-AP MLD having two non-AP entities and an AP MLD having two AP entities perform multi-link setup, an EHT non-AP (i.e., ETH STA) and an EHT AP may be associated through Link 1, and EHT non-AP 2 and AP 2 may be associated through Link 2. In addition, in 11be, a multi-link setup method in which link setup is performed for all or some links between MLDs based on one frame exchange is being considered. In other words, link setup for Link 1 and Link 2 may be performed based on one frame exchange.

Also, in 11be, using a single AID (Association ID) of EHT MLD is considered. This is for backward compatibility with previous specifications, and means that each MLD has one AID. When MLDs have one common AID, association can also be performed at the MLD level in the multi-link setup process between MLDs. Therefore, when association between MLDs is performed through the multi-link setup process, association can be made for all entities between MLDs based on one frame exchange. However, association may be performed only for some entities based on the capabilities of the entities. Therefore, when an EHT AP MLD and an EHT non-AP MLD perform initial multi-link setup, because association is performed at the MLD level, if necessary, when association is performed by exchanging information about all entities, after the initial multi-link setup, the EHT non-AP of the EHT non-AP MLD may be able to switch the link to another AP entity (i.e., another BSS) of the connected AP MLD without a separate association process.

Figure 31:
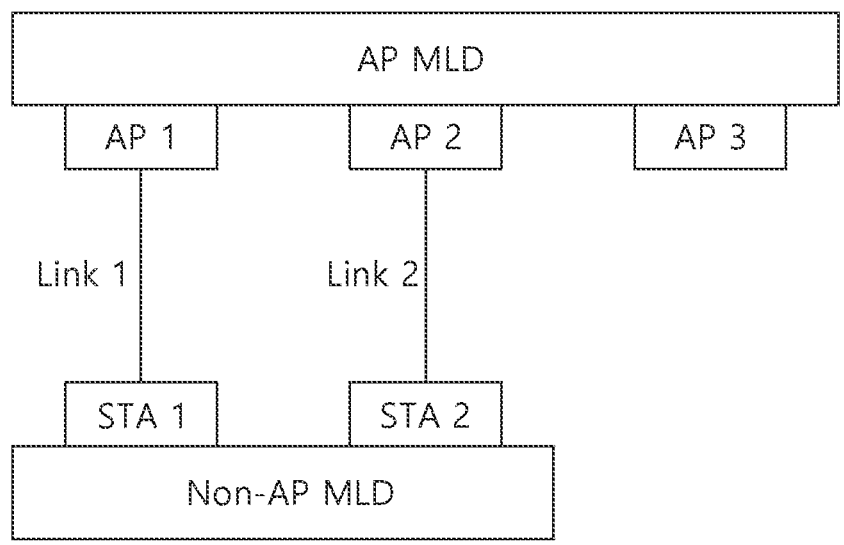
FIG. 31 is a diagram illustrating an embodiment of a multi-link setup method between MLDs.

FIG. 31 is a diagram illustrating an embodiment of a multi-link setup method between MLDs.

Referring to FIG. 31, when an AP MLD and a non-AP MLD exist, Link 1 and Link 2 may be configured through association in a multi-link setup process. At this time, when the non-AP MLD and an AP MLD perform association for multi-link setup, although the STA entity may perform association only for the enabled link it will use, afterwards, considering seamless link switching, etc., the STA entity may perform association for all AP entities that perform association in the initial multi-link setup process. Enabled link refers to a link in which an STA is currently associated with an AP and operates, and may also be referred to as an operating link. Enabled link may mean a link used by an STA for frame exchange with an AP and mapped with at least one TID. An example of this is given below.

Figure 32:
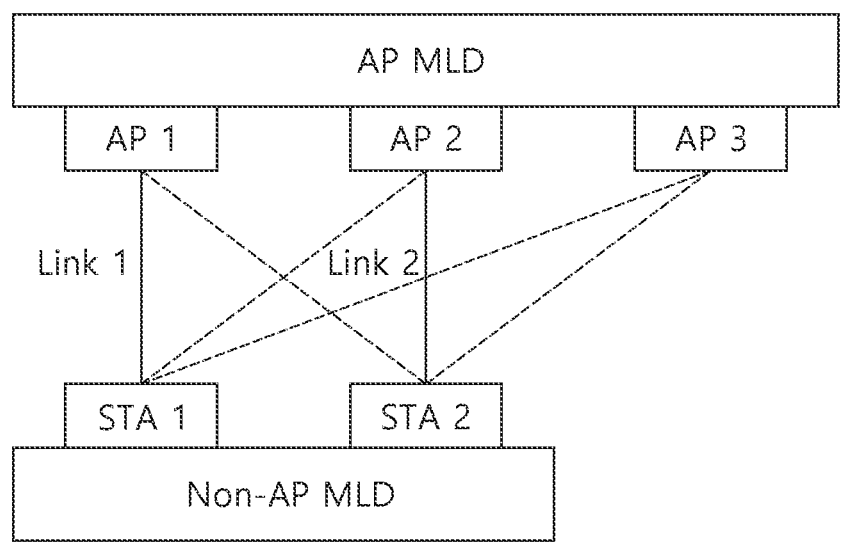
FIG. 32 is a diagram illustrating an embodiment of a multi-link setup method between MLDs.

FIG. 32 is a diagram illustrating an embodiment of a multi-link setup method between MLDs.

Referring to FIG. 32, the non-AP MLD may perform association with all entities of the AP MLD.

For example, when anon-AP MLD and an AP MLD perform association, STA1 may perform association with AP2 and AP3 as well as AP1. In this case, the link on which STA 1 actually operates is Link 1 with AP 1, but the STA1 may perform link setup without a separate association process with AP 2 and AP 3 through link switching (e.g., TID-to-link mapping update). The link in which STA 1 is set as an operating link is called an enabled link, a link that has been associated but not set as an enabled link is called a disabled link (the name of the exact link may be changed later). Therefore, when the non-AP MLD performs association for all AP entities in the AP MLD during the initial multi-link setup process, after that, the non-AP MLD may dynamically switch the link for each AP entity by enabling or disabling it.

Or, for example, when a non-AP MLD and an AP MLD perform association, STA1 may perform association with only one AP (e.g., AP1). The STA2 may perform association with AP2. One STA cannot perform association with multiple APs. An enabled link may mean a case in which a corresponding link is mapped with at least one TID (traffic identifier), a disabled link may mean a case in which a corresponding link is not mapped to any TID.

The BSS load element defined in the existing standards does not consider the characteristics of these EHT MLDs. The previously defined BSS load element is information indicating the load for each BSS for AP load balancing. Among them, the 'STA count' field means the number of STAs currently associated with the BSS. The STA may determine the number of STAs currently associated with the BSS based on the 'STA count' field information of the BSS load element, based on this, the STA may be associated with the AP in a distributed manner.

However, if the existing BSS load element definition in the 11be standard is used as it is, ambiguity may occur. In the existing standard, because legacy devices have only a single link, the number of STAs associated with the BSS meant the number of STAs actually using the corresponding BSS as an operating link, however, it may be different in an MLD environment. When a non-AP MLD and an AP MLD perform association for all entities based on multi-link setup, although the EHT non-AP is associated with the BSS, the EHT non-AP may not actually use the corresponding BSS as an operating link (i.e., enabled link).

For example, referring to FIG. 32, in the case of AP 1, the number of currently connected STAs is a total of two (STA1, STA2), but the total number of STAs using the corresponding BSS as an operating link is one (STA 1). Therefore, when using the existing BSS load element definition as it is, AP 1 may indicate 'STA count' field=2. However, since there is only one STA that uses the corresponding BSS as an operating link, accurate information cannot be delivered to the STA if the existing definition is used as it is.

Or, for example, when a non-AP MLD and an AP MLD perform association. STA1 may perform association with only one AP (e.g., AP1). The STA2 may perform association with AP2. One STA cannot perform association with multiple APs. An enabled link may mean a case in which a corresponding link is mapped with at least one TID (traffic identifier), a disabled link may mean a case in which a corresponding link is not mapped to any TID. That is, although STA1 is associated with AP1 through link 1, link 1 may be enabled or disabled. Link 2 may also be enabled or disabled in the same way. That is, the STA is associated with multiple APs, has multiple links, and does not enable one link among the multiple links. An STA has one link, but the one link can be enabled or disabled.

Therefore, it is necessary to consider the multi-link characteristics of such an MLD in the existing BSS load element.

In the present disclosure, a new field is defined to solve the problems mentioned above.

"Enabled Station Count" (sub)field: The number of STAs that use the corresponding BSS as an operating link (i.e., Enabled link or Operating link) among STAs associated with the current BSS. The exact name can be changed and can be defined as Enabled link count, etc. That is, a link associated with the BSS but not activated and disabled is excluded from the count.

As mentioned above, when an AP MLD uses Single AID to perform association with a non-AP MLD at MLD level, STAs of non-AP MLD may perform link setup in a multi-link setup process. Some of the STAs for which link setup is performed may not be enabled links. That is, some STAs may be set up but disabled links. At this time, since the 'STA count' field of the existing BSS load element is defined as 'the total number of STAs associated with the corresponding BSS', even STAs not used as operating links (i.e., enabled links to which at least one TID is mapped) may be included as STAs associated with the BSS. There is no problem because the existing STA has only one link, but in the MLD environment, in the case of a BSS that is not used by an STA of a non-AP MLD as an operating link (i.e., an enabled link to which at least one TID is mapped), frame exchange does not occur in a disabled state, thus it can be difficult to see 'associated' as the existing concept. Alternatively, even if an STA operating in a disabled link is associated, it needs not be considered as a factor for determining the load of the BSS.

Therefore, in this specification, the "Enabled Station count" field is proposed to provide more accurate information to the EHT device. The information includes only the total number of STAs using the BSS as an actual operating link (i.e., an enabled link to which at least one TID is mapped), and may be more accurate information for measuring the BSS load. For example, this information can be included in the BSS load element.

FIG. 33 is a diagram illustrating an embodiment of a BSS load element.

Referring to FIG. 33, the BSS load element may additionally include a new field considering the MLD. The Station Count provided by the existing BSS load element is ambiguous for MLDs that support multi-link to use, therefore, in the 11be standard, the "Enabled Station Count" field indicating only the number of STAs used as an operating link (i.e., an enabled link to which at least one TID is mapped) as above may be useful information for the EHT STA to predict an accurate BSS load for each BSS.

In addition, Enabled Station Count information may be used together with information considering the single link device (e.g., EHT STA or legacy device supporting single radio) proposed above to provide clear BSS load information to the EHT STA.

FIG. 34 is a diagram illustrating an embodiment of a BSS load element.

Referring to FIG. 34, the BSS load element may additionally include a new field considering the MLD.

In addition, the 11be standard may define a new EHT BSS load element for the EHT STA. An example of this is given below.

FIG. 35 is a diagram illustrating an embodiment of an EHT BSS load element.

Referring to FIG. 35, the EHT BSS load element may include an 'EHT STA Count' field as a new field considering MLD with multi-link. The description of the EHT STA Count field is as follows.

'EHT STA Count' field: The total number of STAs associated with the BSS as Enabled STAs (that is, the number of STAs used as enabled links) among STAs currently associated with the BSS. The exact name of this field can be changed.

In addition to the EHT STA Count field, the EHT BSS load element may additionally include a 'Single link device count' field. An example for this is as follows.

FIG. 36 is a diagram illustrating an embodiment of an EHT BSS load element.

Referring to FIG. 36, the BSS load element may optionally include the following fields.

Legacy STA count with Single Link (SL): The number of legacy devices among the number of STAs currently associated with the AP.

STA count with single link (SL): the number of single link STAs among the number of STAs currently associated with the AP. Here, the single link STA includes both a legacy device and an EHT device supporting single radio.

STA count with multi link (ML): The number of STAs in non-AP MLD having multi-link among the number of STAs currently associated with the AP.

Based on the above information, the EHT STA may improve load balancing of the AP MLD by appropriately selecting a BSS to be newly connected or a BSS to be switched to by considering the load situation of each BSS.

Figure 37:
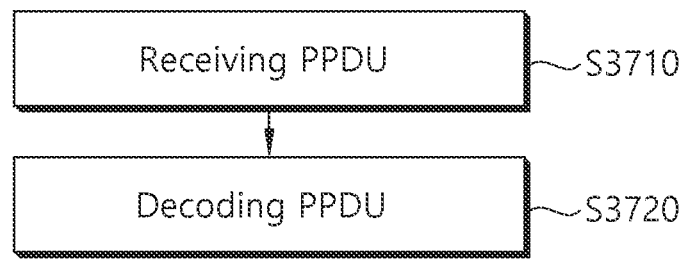
FIG. 37 is a diagram illustrating an embodiment of a method of operating an STA.

FIG. 37 is a diagram illustrating an embodiment of a method of operating an STA.

Referring to FIG. 37, the STA may receive a PPDU (S3710). For example, an STA may receive a physical protocol data unit (PPDU) including basic service set (BSS) load information from an access point (AP). For example, the BSS load information may include information related to the number of STAs associated with the BSS of the AP and the number of enabled STAs among STAs associated with the BSS of the AP.

For example, STAs associated with the BSS of the AP include an enabled STA and a disabled STA, the disabled STA may include an STA operating in a link to which no traffic identifier (TID) is mapped.

For example, the link on which the enabled STA operates may include a link to which at least one TID (traffic identifier) is mapped.

For example, the BSS load information may further include information related to the number of single link STAs associated with the BSS of the AP.

For example, the BSS load information may further include information related to the number of STAs associated with the BSS of the AP and supporting an extremely high throughput (EHT) WLAN system.

For example, the BSS load information may further include information related to the number of legacy STAs associated with the BSS of the AP.

For example, the BSS load information may further include information related to the number of STAs associated with the BSS of the AP and supporting multi-link.

Each field information included in the BSS load element is as follows.

Station Count: The total number (unsigned integer) of STAs currently associated with the corresponding BSS.

Channel Utilization: Percentage of time that medium sensed by the AP is busy. For example, the AP may detect when the medium is busy by means of a physical or virtual carrier sense mechanism.

Available Admission Capacity: A field (unsigned integer) indicating the amount of remaining medium time available through explicit admission control.

The 11be standard defines a multi-link device in which a device supports multiple links. That is, when an AP has multiple links, it is called an AP MLD, and when a non-AP STA has multiple links, it is called a non-AP MLD. Alternatively, the AP MLD may include a plurality of APs, each AP may have only one link, and the non-AP MLD may also include a plurality of non-AP STAs and each non-AP STA may have only one link. In this case, that the AP MLD may have multiple links means that one AP MLD logically has several AP entities, which means that each AP entity of the AP MLD may have its own BSS. Therefore, when the non-AP MLD performs multi-link setup with the AP MLD, each AP entity of the AP MLD has an independent BSS and may perform link setup for each BSS. An embodiment of such a multi-link setup process is as follows.

Referring to FIG. 30, for example, when a non-AP MLD having two non-AP entities and an AP MLD having two AP entities perform multi-link setup, an EHT non-AP (i.e., ETH STA) and an EHT AP may be associated through Link 1, and EHT non-AP 2 and AP 2 may be associated through Link 2. In addition, in 11be, a multi-link setup method in which link setup is performed for all or some links between MLDs based on one frame exchange is being considered. In other words, link setup for Link 1 and Link 2 may be performed based on one frame exchange.

Also, in 11be, using a single AID (Association ID) of EHT MLD is considered. This is for backward compatibility with previous specifications, and means that each MLD has one AID. When MLDs have one common AID, association can also be performed at the MLD level in the multi-link setup process between MLDs. Therefore, when association between MLDs is performed through the multi-link setup process, association can be made for all entities between MLDs based on one frame exchange. However, association may be performed only for some entities based on the capabilities of the entities. Therefore, when an EHT AP MLD and an EHT non-AP MLD perform initial multi-link setup, because association is performed at the MLD level, if necessary, when association is performed by exchanging information about all entities, after the initial multi-link setup, the EHT non-AP of the EHT non-AP MLD may be able to switch the link to another AP entity (i.e., another BSS) of the connected AP MLD without a separate association process.

When an AP MLD and a non-AP MLD exist, Link 1 and Link 2 may be configured through association in a multi-link setup process. At this time, when the non-AP MLD and an AP MLD perform association for multi-link setup, although the STA entity may perform association only for the enabled link it will use, afterwards, considering seamless link switching, etc., the STA entity may perform association for all AP entities that perform association in the initial multi-link setup process. Enabled link refers to a link in which an STA is currently associated with an AP and operates, and may also be referred to as an operating link. Enabled link may mean a link used by an STA for frame exchange with an AP and mapped with at least one TID. An example of this is given below.

For example, when a non-AP MLD and an AP MLD perform association, STA1 may perform association with only one AP (e.g., AP1). The STA2 may perform association with AP2. One STA cannot perform association with multiple APs. An enabled link may mean a case in which a corresponding link is mapped with at least one TID (traffic identifier), a disabled link may mean a case in which a corresponding link is not mapped to any TID.

The BSS load element defined in the existing standards does not consider the characteristics of these EHT MLDs. The previously defined BSS load element is information indicating the load for each BSS for AP load balancing. Among them, the 'STA count' field means the number of STAs currently associated with the BSS. The STA may determine the number of STAs currently associated with the BSS based on the 'STA count' field information of the BSS load element, based on this, the STA may be associated with the AP in a distributed manner.

However, if the existing BSS load element definition in the 11be standard is used as it is, ambiguity may occur. In the existing standard, because legacy devices have only a single link, the number of STAs associated with the BSS meant the number of STAs actually using the corresponding BSS as an operating link, however, it may be different in an MLD environment. When a non-AP MLD and an AP MLD perform association for all entities based on multi-link setup, although the EHT non-AP is associated with the BSS, the EHT non-AP may not actually use the corresponding BSS as an operating link (i.e., enabled link).

Or, for example, when a non-AP MLD and an AP MLD perform association, STA1 may perform association with only one AP (e.g., AP1). The STA2 may perform association with AP2. One STA cannot perform association with multiple APs. An enabled link may mean a case in which a corresponding link is mapped with at least one TID (traffic identifier), a disabled link may mean a case in which a corresponding link is not mapped to any TID. That is, although STA1 is associated with AP1 through link 1, link 1 may be enabled or disabled. Link 2 may also be enabled or disabled in the same way. That is, the STA is associated with multiple APs, has multiple links, and does not enable one link among the multiple links. An STA has one link, but the one link can be enabled or disabled.

The BSS load element may include the following fields.

"Enabled Station Count" (sub)field: The number of STAs that use the corresponding BSS as an operating link (i.e., Enabled link or Operating link) among STAs associated with the current BSS. The exact name can be changed and can be defined as Enabled link count, etc. That is, a link associated with the BSS but not activated and disabled is excluded from the count.

As mentioned above, when an AP MLD uses Single AID to perform association with a non-AP MLD at MLD level, STAs of non-AP MLD may perform link setup in a multi-link setup process. Some of the STAs for which link setup is performed may not be enabled links. That is, some STAs may be set up but disabled links. At this time, since the 'STA count' field of the existing BSS load element is defined as 'the total number of STAs associated with the corresponding BSS', even STAs not used as operating links (i.e., enabled links to which at least one TID is mapped) may be included as STAs associated with the BSS. There is no problem because the existing STA has only one link, but in the MLD environment, in the case of a BSS that is not used by an STA of a non-AP MLD as an operating link (i.e., an enabled link to which at least one TID is mapped), frame exchange does not occur in a disabled state, thus it can be difficult to see 'associated' as the existing concept. Alternatively, even if an STA operating in a disabled link is associated, it needs not be considered as a factor for determining the load of the BSS.

Therefore, in this specification, the "Enabled Station count" field is proposed to provide more accurate information to the EHT device. The information includes only the total number of STAs using the BSS as an actual operating link (i.e., an enabled link to which at least one TID is mapped), and may be more accurate information for measuring the BSS load. For example, this information can be included in the BSS load element.

The BSS load element may additionally include anew field considering the MLD. The Station Count provided by the existing BSS load element is ambiguous for MLDs that support multi-link to use, therefore, in the 11be standard, the "Enabled Station Count" field indicating only the number of STAs used as an operating link (i.e., an enabled link to which at least one TID is mapped) as above may be useful information for the EHT STA to predict an accurate BSS load for each BSS.

In addition. Enabled Station Count information may be used together with information considering the single link device (e.g., EHT STA or legacy device supporting single radio) proposed above to provide clear BSS load information to the EHT STA.

The BSS load element may optionally include the following fields.

Legacy STA count with Single Link (SL): The number of legacy devices among the number of STAs currently associated with the AP.

STA count with single link (SL): the number of single link STAs among the number of STAs currently associated with the AP. Here, the single link STA includes both a legacy device and an EHT device supporting single radio.

STA count with multi link (ML): The number of STAs in non-AP MLD having multi-link among the number of STAs currently associated with the AP.

Based on the above information, the EHT STA may improve load balancing of the AP MLD by appropriately selecting a BSS to be newly connected or a BSS to be switched to by considering the load situation of each BSS.

The STA may decode the PPDU (S3720).

Figure 38:
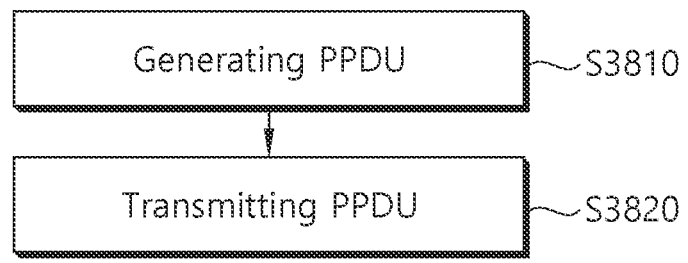
FIG. 38 is a diagram illustrating an embodiment of an AP operating method.

FIG. 38 is a diagram illustrating an embodiment of an AP operating method.

Referring to FIG. 38, the AP may generate a PPDU (S3810). For example, the AP may generate a physical protocol data unit (PPDU) including basic service set (BSS) load information. For example, the BSS load information may include information related to the number of STAs associated with the BSS of the AP and the number of enabled STAs among STAs associated with the BSS of the AP.

For example, STAs associated with the BSS of the AP include an enabled STA and a disabled STA, the disabled STA may include an STA operating in a link to which no traffic identifier (TID) is mapped.

For example, the link on which the enabled STA operates may include a link to which at least one TID (traffic identifier) is mapped.

For example, the BSS load information may further include information related to the number of single link STAs associated with the BSS of the AP.

For example, the BSS load information may further include information related to the number of STAs associated with the BSS of the AP and supporting an extremely high throughput (EHT) WLAN system.

For example, the BSS load information may further include information related to the number of legacy STAs associated with the BSS of the AP.

For example, the BSS load information may further include information related to the number of STAs associated with the BSS of the AP and supporting multi-link.

The AP may transmit the PPDU (S3820). For example, the AP may transmit the PPDU to the STA.

Some of the detailed steps shown in the examples of FIGS. 37 and 38 may not be essential steps and may be omitted. In addition to the steps shown in FIGS. 37 and 38, other steps may be added, and the order of the steps may be changed. Some of the above steps may have their own technical meaning.

The technical features of the present specification described above may be applied to various devices and methods. For example, the technical features of the present specification described above may be performed/supported through the device of FIGS. 1 and/or 5. For example, the technical features of the present specification described above may be applied only to a part of FIGS. 1 and/or 5. For example, the technical features of the present specification described above are implemented based on the processing chips 114 and 124 of FIG. 1, or implemented based on the processors 111 and 121 and the memories 112 and 122 of FIG. 1, may be implemented based on the processor 610 and the memory 620 of FIG. 5. For example, in the device of the present specification, the device includes a memory and a processor operatively coupled to the memory, wherein the processor is adapted to perform operation comprising: receiving a physical protocol data unit (PPDU) including basic service set (BSS) load information from an access point (AP), wherein the BSS load information includes information related to the number of STAs associated with the BSS of the AP and the number of enabled STAs among the STAs associated with the BSS of the AP; and decoding the PPDU.

Technical features of the present specification may be implemented based on a computer readable medium (CRM). For example, the CRM proposed by the present disclosure, may be At least one computer readable medium including instructions based on being executed by at least one processor of a station (STA) of a Wireless Local Area Network system, the instructions comprising: receiving a physical protocol data unit (PPDU) including basic service set (BSS) load information from an access point (AP), wherein the BSS load information includes information related to the number of STAs associated with the BSS of the AP and the number of enabled STAs among the STAs associated with the BSS of the AP; and decoding the PPDU.

Instructions stored in the CRM of the present specification may be executed by at least one processor. At least one processor related to the CRM of the present specification may be the processors 111 and 121 or the processing chips 114 and 124 of FIG. 1 or the processor 610 of FIG. 5. Meanwhile, the CRM of this specification may be the memories 112 and 122 of FIG. 1, the memory 620 of FIG. 5, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a non-access point (non-AP) multi-link device (MLD) of a wireless local area network (WLAN) system, comprising:
receiving, by a first non-AP station (STA) affiliated with the non-AP MLD, a physical protocol data unit (PPDU) including basic service set (BSS) load information from a first AP affiliated with an access point multi-link device (AP MLD); and
decoding, by the first non-AP STA, the PPDU,
wherein the first non-AP STA and a second non-AP STA are affiliated with the non-AP MLD,
wherein a first link between the first AP and the first non-AP STA associated with the BSS of the first AP and a second link between the first AP and the second non-AP STA associated with the BSS of the first AP are setup between the AP MLD and the non-AP MLD,
wherein the first link is defined as enabled for the first non-AP STA based on at least one traffic identifier (TID) being mapped to the first link,
wherein the second link is defined as disabled for the second non-AP STA based on no TID being mapped to the second link,
wherein the BSS load information includes a STA count field and an enabled STA count field,
wherein the STA count field includes information related to a number of the first non-AP STA and the second non-AP STA, and
wherein the enabled STA count field includes information related to a number of the first non-AP STAs.

2. The method of claim 1,
wherein the BSS load information further includes a single link field, and
wherein the single link field includes information related to a number of single link non-AP STAs associated with the BSS of the first AP.

3. The method of claim 1,
wherein the BSS load information further includes an EHT field, and
wherein the EHT field includes the information related to a number of non-AP STAs associated with the BSS of the first AP and supporting an extremely high throughput (EHT) wireless LAN system.

4. The method of claim 1,
wherein the BSS load information further includes a legacy field, and
wherein the legacy field includes the information related to a number of legacy non-AP STAs associated with the BSS of the first AP.

5. A non-access point (non-AP) multi-link device (MLD) of a wireless local area network (WLAN) system, comprising:
a transceiver for transmitting and receiving radio signals; and a processor connected to the transceiver, wherein the processor is adapted to perform operations comprising:

receiving, by a first non-AP station (STA) affiliated with the non-AP MLD, a physical protocol data unit (PPDU) including basic service set (BSS) load information from a first AP affiliated with an access point multi-link device (AP MLD); and decoding, by the first non-AP STA, the PPDU, wherein the first non-AP STA and a second non-AP STA are affiliated with the non-AP MLD, wherein a first link between the first AP and the first non-AP STA associated with the BSS of the first AP and a second link between the first AP and the second non-AP STA associated with the BSS of the first AP are setup between the AP MLD and the non-AP MLD, wherein the first link is defined as enabled for the first non-AP STA based on at least one traffic identifier (TID) being mapped to the first link, wherein the second link is defined as disabled for the second non-AP STA based on no TID being mapped to the second link, wherein the BSS load information includes a STA count field and an enabled STA count field, wherein the STA count field includes information related to a number of the first non-AP STA and the second non-AP STA, and wherein the enabled STA count field includes information related to a number of the first non-AP STAs.

6. The non-AP MLD of claim 5, wherein the BSS load information further includes a single link field, and wherein the single link field includes information related to a number of single link non-AP STAs associated with the BSS of the first AP.

7. The non-AP MLD of claim 5, wherein the BSS load information further includes an EHT field, and wherein the EHT field includes the information related to a number of non-AP STAs associated with the BSS of the first AP and supporting an extremely high throughput (EHT) wireless LAN system.

8. The non-AP MLD of claim 5, wherein the BSS load information further includes a legacy field, and wherein the legacy field includes the information related to a number of legacy non-AP STAs associated with the BSS of the first AP.

9. An access point (AP) multi-link device (MLD) of a wireless local area network (WLAN) system, comprising:

a transceiver for transmitting and receiving radio signals; and a processor connected to the transceiver, wherein the processor is adapted to perform operations comprising:

generating, by a first AP affiliated with the AP MLD, a physical protocol data unit (PPDU) including basic service set (BSS) load information, and transmitting, by the first AP, the PPDU to a first non-access point (non-AP) station (STA) affiliated with a non-AP multi-link device (MLD), wherein the first non-AP STA and a second non-AP STA are affiliated with the non-AP MLD wherein a first link between the first AP and the first non-AP STA associated with the BSS of the first AP and a second link between the first AP and the second non-AP STA associated with the BSS of the first AP are setup between the AP MLD and the non-AP MLD, wherein the first link is defined as enabled for the first non-AP STA based on at least one traffic identifier (TID) being mapped to the first link, wherein the second link is defined as disabled for the second non-AP STA based on no TID being mapped to the second link, wherein the BSS load information includes a STA count field and an enabled STA count field, wherein the STA count field includes information related to a number of the first non-AP STA and the second non-AP STA, and wherein the enabled STA count field includes information related to a number of the first non-AP STAs.

* * * * *